(12) United States Patent
Shoshan et al.

(10) Patent No.: US 11,186,314 B2
(45) Date of Patent: Nov. 30, 2021

(54) ARTICULATED VEHICLE ASSEMBLY AND ARTICULATION SYSTEM FOR USE THEREIN

(71) Applicant: Plasan Sasa Ltd., M.P. Marom Hagalil (IL)

(72) Inventors: Amir Ben Shoshan, D.N. Chevel Korazim (IL); Asaf Engel, M.P. Marom Hagalil (IL)

(73) Assignee: PLASAN SASA LTD., M.P. Marom Hagalil (IL)

( * ) Notice: Subject to any disclaimer, the term of this patent is extended or adjusted under 35 U.S.C. 154(b) by 19 days.

(21) Appl. No.: 16/546,671

(22) Filed: Aug. 21, 2019

(65) Prior Publication Data

US 2020/0062306 A1 Feb. 27, 2020

(30) Foreign Application Priority Data

Aug. 22, 2018 (IL) .......................................... 261325
Sep. 6, 2018 (IL) .......................................... 261672

(51) Int. Cl.
*B62D 12/00* (2006.01)

(52) U.S. Cl.
CPC .................................. *B62D 12/00* (2013.01)

(58) Field of Classification Search
CPC . B60D 1/173; B60D 1/32; B60D 1/62; B62D 12/00; B62D 12/02; B62D 13/005; B62D 53/00; B62D 53/028
See application file for complete search history.

(56) References Cited

U.S. PATENT DOCUMENTS 3,000,651 A * 9/1961 Gouirand ................. B60G 7/02
280/124.157
3,353,618 A 11/1967 Gordon
(Continued)

FOREIGN PATENT DOCUMENTS

CH 665178 A5 4/1988
CH 705800 B1 6/2015
(Continued)

OTHER PUBLICATIONS

Bolzern, P. et al., "An Input-Output Linearization Approach to the Control of an n-Body Articulated Vehicle", Journal of Dynamic Systems, Measurement, and Control; vol. 123, Sep. 2001, pp. 309-316.
(Continued)

*Primary Examiner* — Behrang Badii
*Assistant Examiner* — Daniel L Greene
(74) *Attorney, Agent, or Firm* — Dorsey & Whitney, LLP

(57) ABSTRACT

An articulated vehicle assembly comprising a master vehicle having a master steering system and an onboard sensor arrangement configured to monitor at least said master steering system; a slave vehicle having a slave steering system and an onboard actuator arrangement configured to manipulate at least said slave steering system; an articulation system for articulating in a queue the master and the slave vehicles along a common longitudinal axis; and a processing unit configured to receive input signals from the onboard sensor arrangement and produce corresponding output signals to the onboard actuator arrangement to manipulate said slave steering system so as to maintain the master vehicle and the slave vehicle aligned along the common longitudinal axis, at least when the master vehicle performs a turn on a horizontal plane.

18 Claims, 10 Drawing Sheets

(56) References Cited

U.S. PATENT DOCUMENTS

| | | | |
|---|---|---|---|
| 3,414,072 A * | 12/1968 | Hodges, Jr. | B62D 5/09 |
| | | | 180/24 |
| 3,578,096 A | 5/1971 | Pearson | |
| 3,612,312 A | 10/1971 | Behrmann | |
| 3,717,215 A | 2/1973 | Nigg et al. | |
| 3,899,039 A * | 8/1975 | McHugh | B60K 5/10 |
| | | | 180/11 |
| 4,033,426 A | 7/1977 | Williams | |
| 4,072,203 A | 2/1978 | Pierson | |
| 4,502,561 A * | 3/1985 | Kober | B60D 1/06 |
| | | | 280/455.1 |
| 4,505,347 A | 3/1985 | Prechtel | |
| 4,650,018 A | 3/1987 | Silverman | |
| 4,714,264 A * | 12/1987 | Woestelandt | B60D 1/173 |
| | | | 180/282 |
| 4,771,838 A | 9/1988 | Ketcham | |
| 5,165,838 A * | 11/1992 | Kallansrude | B60G 17/0152 |
| | | | 198/782 |
| 5,330,020 A | 7/1994 | Ketcham | |
| 5,332,052 A | 7/1994 | Carnevale | |
| 6,336,683 B1 | 1/2002 | Akiba | |
| 6,725,955 B2 | 4/2004 | Bidwell | |
| 6,746,037 B1 * | 6/2004 | Kaplenski | B60D 1/50 |
| | | | 280/439 |
| 7,115,070 B2 | 10/2006 | Stummer | |
| 7,514,803 B2 | 4/2009 | Wilks | |
| 7,547,980 B2 | 6/2009 | Harrison | |
| 7,743,859 B2 | 6/2010 | Forsyth | |
| 7,798,263 B2 | 9/2010 | Tandy | |
| 8,006,796 B1 * | 8/2011 | Fontaine | B60K 17/356 |
| | | | 180/235 |
| 8,214,108 B2 | 7/2012 | Post et al. | |
| 8,322,965 B2 | 12/2012 | Smith | |
| 8,348,708 B2 | 1/2013 | Kanerva | |
| 8,540,272 B1 | 9/2013 | Vitale et al. | |
| 8,627,908 B2 | 1/2014 | Wellborn et al. | |
| 8,820,443 B2 | 9/2014 | Ferri | |
| 8,863,866 B2 | 10/2014 | Pfister | |
| 9,022,408 B2 | 5/2015 | Nooren | |
| 9,039,029 B2 | 5/2015 | Nooren | |
| 9,073,535 B2 | 7/2015 | Jenkins et al. | |
| 9,139,225 B2 | 9/2015 | Nooren | |
| 9,321,357 B2 | 4/2016 | Caldeira et al. | |
| 9,457,666 B2 | 10/2016 | Caldeira et al. | |
| 9,566,854 B2 | 2/2017 | Kerschl et al. | |
| 9,694,712 B2 | 7/2017 | Healy | |
| 9,740,213 B2 | 8/2017 | Bick et al. | |
| 9,764,748 B2 | 9/2017 | Brooks et al. | |
| 9,802,508 B1 | 10/2017 | Healy | |
| 9,857,255 B2 | 1/2018 | Hagan | |
| 10,118,505 B2 | 11/2018 | Healy | |
| 10,384,560 B2 | 8/2019 | Healy | |
| 10,449,954 B2 | 10/2019 | Layfield et al. | |
| 10,518,831 B2 | 12/2019 | Wright | |
| 10,654,369 B2 | 5/2020 | Healy | |
| 10,752,102 B2 | 8/2020 | Lampsa et al. | |
| 2003/0090083 A1 * | 5/2003 | Williams | B60D 1/173 |
| | | | 280/460.1 |
| 2005/0230934 A1 | 10/2005 | Wilt | |
| 2006/0085117 A1 | 4/2006 | Stummer | |
| 2007/0120413 A1 * | 5/2007 | Azocar | B60G 5/01 |
| | | | 298/18 |
| 2008/0238138 A1 | 10/2008 | Vallee | |
| 2009/0124143 A1 | 5/2009 | Kanerva | |
| 2009/0152832 A1 * | 6/2009 | Moore | B60D 1/32 |
| | | | 280/455.1 |
| 2010/0052290 A1 * | 3/2010 | McCune | B60D 1/322 |
| | | | 280/455.1 |
| 2010/0133780 A1 * | 6/2010 | Jarvelin | B62D 53/0835 |
| | | | 280/400 |
| 2010/0181743 A1 * | 7/2010 | Timmons, Jr. | B60D 1/30 |
| | | | 280/442 |
| 2011/0253463 A1 | 10/2011 | Smith | |
| 2015/0042066 A1 | 2/2015 | Nooren | |
| 2015/0042073 A1 | 2/2015 | Nooren | |
| 2015/0204741 A1 | 7/2015 | Hagan | |
| 2015/0306946 A1 | 10/2015 | Jenkins et al. | |
| 2016/0057921 A1 * | 3/2016 | Pickett | G05D 1/021 |
| | | | 701/41 |
| 2017/0021881 A1 | 1/2017 | Jacobsen et al. | |
| 2017/0129558 A1 | 5/2017 | Gugel et al. | |
| 2018/0319268 A1 * | 11/2018 | McAdam | B62D 53/026 |

FOREIGN PATENT DOCUMENTS

| | | |
|---|---|---|
| CH | 705801 B1 | 6/2015 |
| CN | 201633802 U | 11/2010 |
| CN | 102582703 A | 7/2012 |
| CN | 105235548 A | 1/2016 |
| CN | 106394708 A | 2/2017 |
| DE | 2547362 A1 | 4/1977 |
| DE | 3009772 A1 | 9/1981 |
| DE | 3829638 A1 | 6/1989 |
| DE | 4324211 A1 | 1/1995 |
| DE | 102006030347 A1 | 1/2008 |
| DE | 102010042268 A1 | 4/2012 |
| DE | 102010042270 A1 | 4/2012 |
| DE | 102012107648 A1 | 5/2014 |
| DE | 102015010749 A1 | 3/2016 |
| DE | 202015002528 U1 | 7/2016 |
| DE | 202016006076 U1 | 12/2016 |
| DE | 102016204090 A1 | 9/2017 |
| EP | 0040111 A1 | 11/1981 |
| EP | 0092952 A1 | 11/1983 |
| EP | 2394835 A1 | 12/2011 |
| EP | 2556973 A1 | 2/2013 |
| EP | 2394835 B1 | 7/2013 |
| EP | 2974905 A1 | 1/2016 |
| FR | 2062911 A1 | 7/1971 |
| FR | 2460223 B3 | 6/1982 |
| FR | 2696130 A1 | 4/1994 |
| FR | 3046592 B1 | 6/2019 |
| NL | 1035843 C | 3/2010 |
| NL | 2015873 B1 | 6/2017 |
| WO | 8602048 A1 | 4/1986 |
| WO | 03022665 A1 | 3/2003 |
| WO | 03099603 A1 | 12/2003 |
| WO | 2004074031 A1 | 9/2004 |
| WO | 2004074032 A1 | 9/2004 |
| WO | 2004101344 A2 | 11/2004 |
| WO | 2007057904 A1 | 5/2007 |
| WO | 2007062640 A2 | 6/2007 |
| WO | 2007070988 A1 | 6/2007 |
| WO | 2007132121 A1 | 11/2007 |
| WO | 2009023931 A1 | 2/2009 |
| WO | 2009141526 A2 | 11/2009 |
| WO | 2011031410 A2 | 3/2011 |
| WO | 2011031916 A2 | 3/2011 |
| WO | 2011041604 A1 | 4/2011 |
| WO | 2011062545 A1 | 5/2011 |
| WO | 2011100198 A2 | 8/2011 |
| WO | 2011108948 A1 | 9/2011 |
| WO | 2012095615 A1 | 7/2012 |
| WO | 2012125903 A2 | 9/2012 |
| WO | 2012171536 A1 | 12/2012 |
| WO | 2015185215 A1 | 12/2015 |
| WO | 2015197173 A1 | 12/2015 |
| WO | 2016023570 A1 | 2/2016 |
| WO | 2016099344 A1 | 6/2016 |
| WO | 2016116655 A1 | 7/2016 |
| WO | 2016156383 A1 | 10/2016 |

OTHER PUBLICATIONS

Gage, Thomas B. et al., "Low-Emission Range Extender for Electric Vehicles", SAE Technical Paper 972634, Aug. 6, 1997, 10 pages.

Jujnovich, B.A. et al., "Path-Following Steering Control for Articulated Vehicles", Journal of Dynamic Systems, Measurement, and Control; vol. 135, May 2013, pp. 031006-1-031006-15.

Kang, Jae Y. et al., "Linear Vehicle Dynamics of the TowPlow, a Steerable Articulated Snowplow, and Its Kinematice-Based Steering

(56) References Cited

OTHER PUBLICATIONS

Control", Journal of Dynamic Systems, Measurement, and Control; vol. 137, Aug. 2015, pp. 081004-1-081004-10.

Kang, Jae Y. et al., "Nonlinear Vehicle Dynamics and Trailer Steering Control of the TowPlow, a Steerable Articulated Snowplowing Vehicle System", Journal of Dynamic Systems, Measurement, and Control; vol. 137, Aug. 2015, pp. 081005-1-081005-13.

Ritzen, Paul et al., "Trailer Steering Control of a Tractor-Trailer Robot", IEEE Transactions on Control Systems Technology, vol. 24, No. 4, Jul. 2016, pp. 1240-1252.

Roebuck, Richard et al., "Implementation of Trailer Steering Control on a Multi-Unit Vehicle at High Speeds", Journal of Dynamic Systems, Measurement, and Control; vol. 136, Mar. 2014, pp. 021016-1-021016-14.

Von Wahlde, Raymond, "A Hitch Angle Measurement Device", Army Research Laboratory, Sep. 1998, 46 pages.

\* cited by examiner

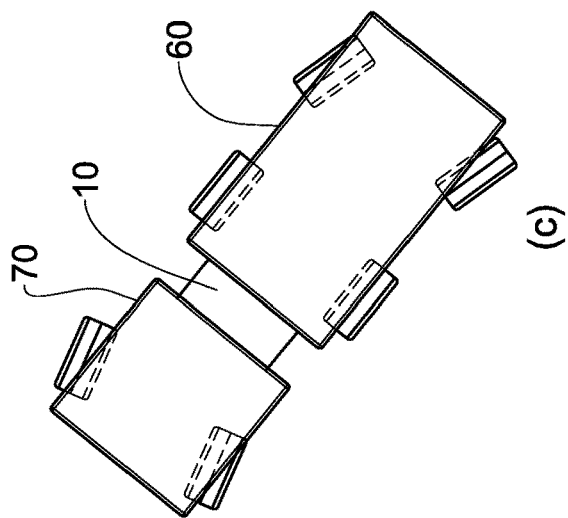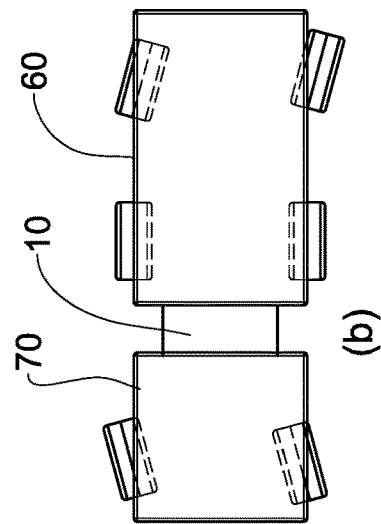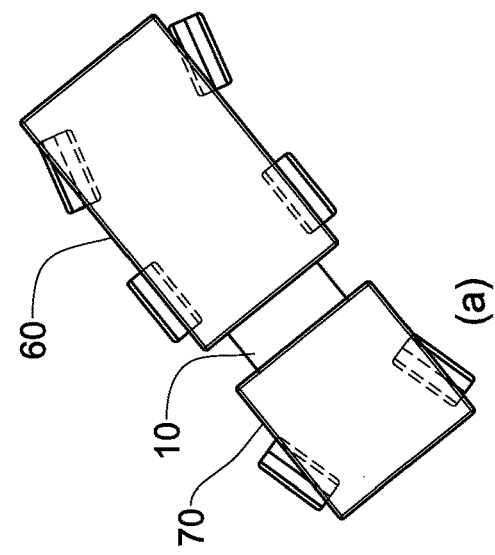
Fig. 4B

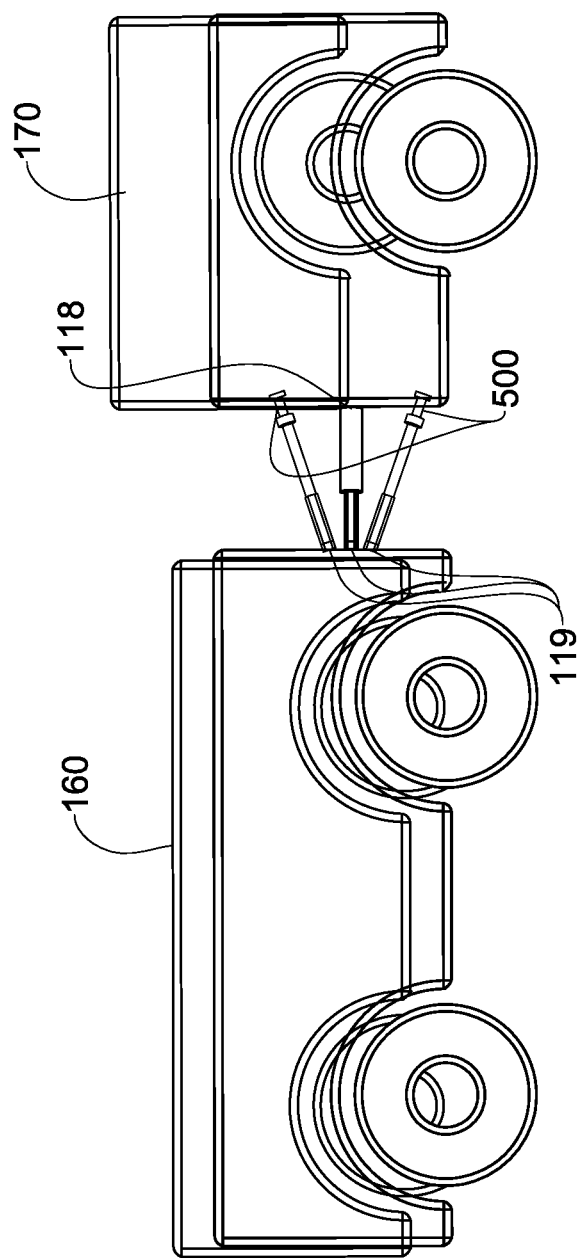

ARTICULATED VEHICLE ASSEMBLY AND ARTICULATION SYSTEM FOR USE THEREIN

TECHNOLOGICAL FIELD

The presently disclosed subject matter refers to articulated vehicle assemblies and articulation systems used therein.

BACKGROUND

One example of an articulated vehicles assembly of the kind, to which the presently disclosed subject matter refers, is described in DE 3009772.

General Description

According to the presently disclosed subject matter, there is provided an articulation system for articulating in a queue two adjacent vehicles along a common longitudinal axis.

According to one aspect of the presently disclosed subject matter, the articulation system comprises at least three elongated members configured to extend between the vehicles, each having a first end connectable to a first vehicle via a first coupling configured to constrain all translational DOF while at least partially allowing at least pitch movement on a vertical plane containing the longitudinal axis, and a second end connectable to a second vehicle via a second coupling, at least one of the second couplings being configured to at least partially constrain the pitch movement and constituting a pitch-constraining coupling, and at least one of the second couplings being configured to at least partially constrain yaw movement on a horizontal plane containing the longitudinal axis and constituting a yaw-constraining coupling.

The at least three elongated members can comprise at least a central member and two outermost elongated members on two sides thereof. In case there are more than three elongated members, the outermost members will be those that are spaced to a maximal distance from the longitudinal axis. The second couplings, via which the second ends of the two outermost elongated members are connectable to the second vehicle, can be other than the pitch-constraining coupling and the yaw-constraining coupling.

Each elongated member with its associated first and second couplings can thus be considered as constituting a bridge assembly having a bridge longitudinal axis extending between the first and second couplings thereof. The bridge assemblies of the outermost members can each comprise an elastic portion configured to perform elastic deformation under load.

The term queue as used herein can refer to two or more vehicles disposed one after the other, even if the vehicles are disposed at different elevations from one another. In this case, the common longitudinal axis will be seen as a straight line, e.g. a central straight line, in a plan view of the articulated vehicles, and it can coincide with a bridge longitudinal axis in case there the bridge assembly is a central bridge assembly.

The term coupling as used herein can refer to any appropriate device used to articulate two articles together, such as a coupler or a joint.

The term degrees of freedom as used herein, translational and rotational, is used to define the allowed movement of one article with respect to an adjacent other article connected thereto, e.g. two adjacent vehicles, an elongated member and a vehicle, etc.

The term maximal distance as used herein refers to a distance between the outermost elongated members and the longitudinal axis, this distance being greater than that between any other elongated member and the common longitudinal axis. The two outermost elongated members can be spaced to different maximal distances from the common longitudinal axis.

Each of the second couplings, via which the second ends of the two outermost elongated members are connectable to the second vehicle, can be configured to at least partially allow one or more of the following: translational movements along the bridge longitudinal axis, a pitch movement along the vertical plane containing the bridge longitudinal axis, and a yaw movement along the horizontal plane containing the bridge longitudinal axis.

The elastic portion of each bridge assembly of the outermost members can also be configured to allow a first extent of deformation per load along the bridge longitudinal axis, and a second extent of deformation per load along an axis perpendicular to the bridge longitudinal axis, the first extent being lower than the second extent for the same load value. This can be useful for allowing biasing movement along the first axis while allowing relatively free movement along the second axis.

According to some embodiments of the presently disclosed subject matter, the elastic portion can be disposed at the second coupling of its respective bridge assembly. The elastic portion can also be integral with this coupling.

The above articulation system can constitute a part of an articulated vehicle assembly, which comprises, in addition to the articulation system, the first and the second vehicles, wherein one of the first and second vehicles is a master vehicle having a master steering system and an onboard sensor arrangement configured to monitor at least the master steering system, which defines a location of a master ICOR (instant center of rotation) related to the master vehicle, on the horizontal plane, and the other vehicle is a slave vehicle having a slave steering system and an onboard actuator arrangement configured to manipulate at least the slave steering system which is configured to define a location of a slave ICOR related with the slave vehicle, on the horizontal plane.

According to the presently disclosed subject matter, an articulated vehicle assembly can comprise one master vehicle and one or two slave vehicles connected directly to the master vehicle from its back or front. The master vehicle can be configured to be manipulated by a user, whilst the slave vehicle can be manipulated by a control system. The assembly can further comprise additional slave vehicles connected thereto at least indirectly. According to some embodiments of the presently disclosed subject matter the slave vehicles can be connected also to one another similarly, from their back or front, using for example the articulation system.

ICOR (instant center of rotation) of each vehicle refers to a point in a fixed disposition relative to a vehicle undergoing planar movement, which point has zero velocity at a particular instant of time. At this instant of time, the velocity vectors of the trajectories of all other points in the vehicle generate a circular field around the ICOR, which is identical to what is generated by a pure rotation of the vehicle about the point. It is clear that this definition refers to a mathematical scenario rather than to a real world scenario, so the term ICOR as used herein refers to a point most proximal to the mathematical ICOR.

The onboard sensor arrangement and the onboard actuator arrangement can constitute a part of a control system further comprising a processor, which is configured to receive, from the onboard sensor arrangement, input steering signals indicative of the location of the master ICOR, and produce corresponding output steering signals to the onboard actuator arrangement to manipulate the slave steering system for bringing the location of the slave ICOR to a location closer to that of the master ICOR, than it had prior to receiving the output steering signals.

The slave steering system and the master steering system can comprise a slave steerable axle and a master steerable axle, respectively. Normally, in a wheeled vehicle, this is the axle connecting between two steerable wheels of the vehicle.

The control system can be configured to manipulate the slave steering system by the actuator arrangement to move the slave steerable axle in a direction opposite to that of the master steerable axle.

Each of the vehicles can comprise one or more steerable wheels, and the control system can be configured, when the master steerable wheels are oriented at a first angle with respect to the common longitudinal axis when viewed from above, to maintain the steerable wheels of the slave vehicle at a second angle correlated with the first angle.

The wheels of the slave vehicle can be drivable and can also be configured to be driven at a second velocity, when the wheels of the master vehicle are driven at a first velocity, the second velocity being correlated with the first velocity.

The correlation between the wheels angle and velocity can be such as to cause the vehicles to turn as a rigid body, i.e. a single elongated vehicle.

The steerable wheels of the master vehicle can be disposed at the front of the master vehicle, and the master vehicle can further comprise non-steerable rear wheels, and the control system can be configured to manipulate the steerable wheels of the slave vehicle so as to prevent translational dragging of the non-steerable wheels on a ground surface at least when the master vehicle performs a turn thereon.

According to another aspect of the presently disclosed subject matter, there is provided an articulated vehicle assembly comprising:
  a master vehicle having a master steering system, which can be configured to be manipulated by a user, and an onboard sensor arrangement configured to monitor at least the master steering system;
  a slave vehicle having a slave steering system and an onboard actuator arrangement configured to manipulate at least the slave steering system;
  an articulation system for articulating in a queue the master and the slave vehicles along a common longitudinal axis, the articulation system being configured to at least partially constrain all translational DOF of the vehicles relative to each other, and at least partially constrain a yaw rotational movement of one of the vehicles with respect to the other on a horizontal plane containing the longitudinal axis; and
  a control system comprising the onboard sensor arrangement, the onboard actuator arrangement and a processing unit configured to receive input signals from the onboard sensor arrangement, and produce corresponding output signals to the onboard actuator arrangement to manipulate the slave steering system so as to maintain the master vehicle and the slave vehicle aligned along the common longitudinal axis, at least when the master vehicle performs a turn on the horizontal plane.

The articulation system can comprise at least three elongated members configured to extend between the master vehicle and the slave vehicle, each having a first end connectable to one of the vehicles via a first coupling configured to constrain all translational DOF while at least partially allowing at least pitch movement on a vertical plane containing the longitudinal axis, and a second end connectable to the other vehicle via a second coupling.

At least one of the second couplings can be configured to at least partially constrain the pitch movement and constituting a pitch-constraining coupling, and at least one of the second couplings being configured to at least partially constrain yaw movement on the horizontal plane and constituting a yaw-constraining coupling.

The at least three elongated members can comprise at least two outermost elongated members disposed at a maximal distance from the longitudinal axis on two sides thereof, the second couplings via which the second ends of the two outermost elongated members are connectable to the second vehicle being other than the pitch-constraining coupling and the yaw-constraining coupling.

Each elongated member with its associated first and second couplings can be considered as constituting a bridge assembly, which can have a bridge longitudinal axis extending between the first and second couplings thereof, and the bridge assemblies of the outermost members can each comprise an elastic portion configured to perform elastic deformation under load.

The second couplings, via which the second ends of the two outermost elongated members are connectable to the second vehicle, can be configured to at least partially allow one or more of the following: translational movement along the bridge longitudinal axis, pitch movement along the vertical plane containing the longitudinal axis, and yaw movement along the horizontal plane containing the longitudinal axis.

The elastic portion can be disposed at the second coupling of its respective bridge assembly.

The elastic portion can be configured to allow a first extent of deformation per load along the bridge longitudinal axis, and a second extent of deformation per load along an axis perpendicular to the bridge longitudinal axis, the first extent being lower than the second extent for the same load value.

The master steering system can be configured to define a location of a master ICOR related to the master vehicle, on the horizontal plane, and wherein the slave steering system can be configured to define a location of a slave ICOR, related to the slave vehicle, on the horizontal plane.

The control system can be configured to receive from the master steering system via the sensor arrangement, input steering signals indicative of the location of the master ICOR, and process them to produce corresponding output steering signals to the actuator arrangement to manipulate the slave steering system for bringing the location of the slave ICOR to a location closer to that of the master ICOR, than it had prior to receiving the output steering signals.

The slave steering system and the master steering system can comprise a slave steerable axle and a master steerable axle, respectively. The control system can be configured to manipulate the slave steering system to move the slave steerable axle in a direction opposite to that of the master steerable axle.

Each of the vehicles can comprise one or more steerable wheels, and the control system can be configured to maintain the steerable wheels of the slave vehicle, when the master steerable wheels are being oriented at a first angle with respect to the common longitudinal axis, when viewed from above, at a second angle correlated with the first angle.

The wheels of the slave vehicle can be drivable and can be configured, when the wheels of the master vehicle are driven at a first velocity, to be driven at a second velocity which is correlated with the first velocity.

The steerable wheels of the master vehicle can be disposed at the front of the master vehicle, and the master vehicle can further comprise non-steerable rear wheels.

The control system can be configured to manipulate the steerable wheels of the slave vehicle so as to prevent translational dragging of the non-steerable wheels on a ground surface when the master vehicle performs a turn thereupon.

According to yet another aspect of the presently disclosed subject matter, there is provided A slave vehicle configured to be articulated to a master vehicle having a master driving system and a master onboard sensor arrangement configured to monitor at least said master driving system, and to be independently driven when not articulated to the master vehicle. The slave vehicle comprises a slave driving system configured to be controlled at a first control mode, at least when the slave vehicle is articulated to the master vehicle, to at least steer the slave vehicle so as to maintain the slave vehicle aligned with the master vehicle along a common longitudinal axis, upon receipt of input signals from said master onboard sensor arrangement at least when the master vehicle performs a turn on a horizontal plane; and to be further controlled at a second control mode, at least when the slave vehicle is independently driven, to drive the slave vehicle independently from said master vehicle.

The slave vehicle can further comprise a control system configured to control the slave driving system at least when the slave vehicle is independently driven.

The control system can comprise an autonomous driving module, configured to autonomously control the slave driving system at least when the slave vehicle is independently driven.

The control system can further comprises a signal receiver configured to receive input signals from an independent controller.

The control system can be configured to produce driving instructions to said slave driving system upon the receipt of the input signals from the independent controller by the signal receiver so as to drive the slave vehicle accordingly, at least when the slave vehicle is independently driven.

The independent controller can be a remote controller configured to operate distally from said slave vehicle. The slave vehicle can further comprise a switch configured to selectively switch between the first and second control modes of the control system.

The slave vehicle can further comprise an engine configured to be coupled to said slave driving system, at least when the slave vehicle is independently driven.

The slave driving system can comprise a slave steering system configured to steer the slave vehicle, and a slave acceleration system configured to accelerate said slave vehicle.

The slave vehicle can further comprise a slave onboard sensor arrangement configured to monitor at least said slave steering system, and thereby render the slave vehicle suitable for use as a master vehicle in an articulated vehicle assembly comprising such master vehicle and another slave vehicle.

EMBODIMENTS

The following are a collection of embodiments, each of which describes an example in which the presently disclosed subject matter can be carried out.

1. An articulation system for articulating in a queue two adjacent vehicles along a common longitudinal axis, said articulation system comprising at least three elongated members configured to extend between said vehicles, each having a first end connectable to a first vehicle via a first coupling configured to constrain all translational DOF while at least partially allowing at least pitch movement on a vertical plane containing said longitudinal axis, and a second end connectable to a second vehicle via a second coupling; at least one of the second couplings being configured to at least partially constrain said pitch movement and constituting a pitch-constraining coupling, and at least one of the second couplings being configured to at least partially constrain yaw movement on a horizontal plane containing said longitudinal axis and constituting a yaw-constraining coupling; wherein the at least three elongated members comprise at least two outermost elongated members disposed at a maximal distance from the longitudinal axis on two sides thereof, the second couplings via which the second ends of the two outermost elongated members are connectable to the second vehicle being other than the pitch-constraining coupling and the yaw-constraining coupling; and wherein each elongated member with its associated first and second couplings constitutes a bridge assembly having a bridge longitudinal axis extending between the first and second couplings thereof, and wherein the bridge assemblies of the outermost members each comprise an elastic portion configured to perform elastic deformation under load.

2. An articulation system according to Embodiment 1, wherein said second couplings, via which the second ends of the two outermost elongated members are connectable to the second vehicle, are configured to at least partially allow translational movement along said bridge longitudinal axis.

3. An articulation system according to Embodiment 2, wherein said elastic portion is disposed at the second coupling of its respective bridge assembly.

4. An articulation system according to Embodiment 3, wherein said second couplings, via which the second ends of the two outermost elongated members are connectable to the second vehicle, are configured to at least partially allow pitch movement along the vertical plane containing said longitudinal axis, and at least partially allow yaw movement along the horizontal plane containing said longitudinal axis.

5. An articulation system according to any of Embodiment 1 to Embodiment 4, wherein said elastic portion is configured to allow a first extent of deformation per load along the bridge longitudinal axis, and a second extent of deformation per load along an axis perpendicular to the bridge longitudinal axis, the first extent being lower than the second extent for the same load value.

6. An articulation system according to any of Embodiment 1 to Embodiment 5, constituting a part of an articulated vehicle assembly, which comprises, in addition to the articulation system, the first and the second vehicles, wherein one of said first and second vehicles is a master vehicle having a master steering system and an onboard sensor arrangement configured to monitor at least said master steering system which defines a location of a master ICOR, related to said master vehicle, on said horizontal plane, and the other vehicle is a slave vehicle having a slave steering system and an onboard actuator arrangement configured to manipulate at least said slave steering system which is configured to define a location of a slave ICOR related with said slave vehicle, on said horizontal plane.

7. An articulation system according to Embodiment 6, wherein said onboard sensor arrangement and said onboard actuator arrangement constitute a part of a control system further comprising a processor which is configured to receive, from said onboard sensor arrangement, input steering signals indicative of the location of said master ICOR, and produce corresponding output steering signals to the onboard actuator arrangement to manipulate said slave steering system for bringing the location of the slave ICOR to a location closer to that of the master ICOR, than it had prior to receiving said output steering signals.

8. An articulation system according to Embodiment 6 or Embodiment 7, wherein said slave steering system and said master steering system comprises a slave steerable axle and a master steerable axle respectively.

9. An articulation system according to Embodiment 8, wherein said control system is configured to manipulate the slave steering system by the actuator arrangement to move the slave steerable axle in a direction opposite to that of said master steerable axle.

10. An articulation system according to any of Embodiments 6 to 9, wherein each of said vehicles comprise one or more steerable wheels, and wherein said control system is configured to maintain the steerable wheels of the slave vehicle, when the master steerable wheels are being oriented at a first angle with respect to said common longitudinal axis, when viewed from above, at a second angle correlated with the first angle.

11. An articulation system according to Embodiment 10, wherein the wheels of the slave vehicle are drivable and configured, when the wheels of the master vehicle are driven at a first velocity, to be driven at a second velocity which is correlated with the first velocity.

12. An articulation system according to Embodiment 10 or Embodiment 11, wherein the steerable wheels of the master vehicle are disposed at the front of said master vehicle, and the master vehicle further comprises non-steerable rear wheels; and wherein said control system is configured to manipulate said steerable wheels of the slave vehicle so as to prevent translational dragging of said non-steerable wheels on a ground surface at least when the master vehicle performs a turn thereupon.

13. An articulated vehicle assembly comprising:
   a master vehicle having a master steering system and an onboard sensor arrangement configured to monitor at least said master steering system;
   a slave vehicle having a slave steering system and an onboard actuator arrangement configured to manipulate at least said slave steering system;
   an articulation system for articulating in a queue the master and the slave vehicles along a common longitudinal axis, said articulation system being configured to at least partially constrain all translational DOF of the vehicles relative to each other, and at least partially constrain a yaw rotational movement of one of the vehicles with respect to the other on a horizontal plane containing said longitudinal axis; and
   a control system consists of the onboard sensor arrangement, the onboard actuator arrangement and a processing unit configured to receive input signals from said onboard sensor arrangement, and produce corresponding output signals to the onboard actuator arrangement to manipulate said slave steering system so as to maintain said master vehicle and the slave vehicle aligned along said common longitudinal axis, at least when said master vehicle performs a turn on said horizontal plane.

14. An articulated vehicle assembly according to Embodiment 13, wherein said articulation system comprising at least three elongated members configured to extend between said master vehicle and said slave vehicle, each having a first end connectable to one of the vehicles via a first coupling configured to constrain all translational DOF while at least partially allowing at least pitch movement on a vertical plane containing said longitudinal axis, and a second end connectable to the other vehicle via a second coupling; at least one of the second couplings being configured to at least partially constrain said pitch movement and constituting a pitch-constraining coupling, and at least one of the second couplings being configured to at least partially constrain yaw movement on said horizontal plane and constituting a yaw-constraining coupling.

15. An articulated vehicle assembly according to Embodiment 13 or Embodiment 14, wherein the at least three elongated members comprise at least two outermost elongated members disposed at a maximal distance from the longitudinal axis on two sides thereof, the second couplings via which the second ends of the two outermost elongated members are connectable to the second vehicle being other than the pitch-constraining coupling and the yaw-constraining coupling.

16. An articulated vehicle assembly according to Embodiment 15, wherein each elongated member with its associated first and second couplings constitutes a bridge assembly having a bridge longitudinal axis extending between the first and second couplings thereof, and wherein the bridge assemblies of the outermost members each comprise an elastic portion configured to perform elastic deformation under load.

17. An articulated vehicle assembly according to Embodiment 16, wherein said second couplings, via which the second ends of the two outermost elongated members are connectable to the second vehicle, are configured to at least partially allow translational movement along said bridge longitudinal axis.

18. An articulated vehicle assembly according to Embodiment 17, wherein said elastic portion is disposed at the second coupling of its respective bridge assembly.

19. An articulated vehicle assembly according to Embodiment 18, wherein said second couplings, via which the second ends of the two outermost elongated members are connectable to the second vehicle, are configured to at least partially allow pitch movement along the vertical plane containing said longitudinal axis, also constituting a pitch-constraining coupling, and at least partially allow yaw movement along the horizontal plane containing said longitudinal axis, also constituting a yaw-constraining coupling.

20. An articulated vehicle assembly according to any of Embodiment 16 to Embodiment 19, wherein said elastic portion is configured to allow a first extent of deformation per load along the bridge longitudinal axis, and a second extent of deformation per load along an axis perpendicular to the bridge longitudinal axis, the first extent being lower than the second extent for the same load value.

21. An articulated vehicle assembly according to any one of Embodiments 13 to 20, wherein the master steering system is configured to be manipulated by a user, and defines a location of a master ICOR, related to said master vehicle, on said horizontal plane, and wherein said slave steering system is configured to define a location of a slave ICOR, related to said slave vehicle, on said horizontal plane.

22. An articulated vehicle assembly according to Embodiment 21, wherein said control system is configured to receive, from said master steering system via said sensor arrangement, input steering signals indicative of the location of said master ICOR, and process them to produce corresponding output steering signals to the actuator arrangement to manipulate said slave steering system for bringing the location of the slave ICOR to a location closer to that of the master ICOR, than it had prior to receiving said output steering signals.

23. An articulated vehicle assembly according to Embodiment 21 or Embodiment 22, wherein said slave steering system and said master steering system comprises a slave steerable axle and a master steerable axle respectively.

24. An articulated vehicle assembly according to Embodiment 23, wherein said control system is configured to manipulate the slave steering system to move the slave steerable axle in a direction opposite to that of said master steerable axle.

25. An articulated vehicle assembly according to any of Embodiments 13 to 24 wherein each of said vehicles comprise one or more steerable wheels, and wherein said control system can be configured to maintain the steerable wheels of the slave vehicle, when the master steerable wheels are being oriented at a first angle with respect to said common longitudinal axis, when viewed from above, at a second angle correlated with the first angle.

26. An articulated vehicle assembly according to Embodiment 25, wherein the wheels of the slave vehicle are drivable and configured, when the wheels of the master vehicle are driven at a first velocity, to be driven at a second velocity which is correlated with the first velocity.

27. An articulated vehicle assembly according to Embodiment 25 or Embodiment 26, wherein the steerable wheels of the master vehicle are disposed at the front of said master vehicle, and the master vehicle further comprises non-steerable rear wheels; and wherein said control system is configured to manipulate said steerable wheels of the slave vehicle so as to prevent translational dragging of said non-steerable wheels on a ground surface when the master vehicle performs a turn thereupon.

28. An articulated vehicle assembly according to any one of embodiments 13 to 27, wherein the slave vehicle is configured to be independently driven when not articulated to the master vehicle, and comprises a slave driving system configured to be controlled at a first control mode, at least when the slave vehicle is articulated to the master vehicle, to at least steer the slave vehicle so as to maintain said slave vehicle aligned with the master vehicle along a common longitudinal axis, upon receipt of input signals from said master onboard sensor arrangement, at least when said master vehicle performs a turn on a horizontal plane; and to be further controlled at a second control mode, at least when the slave vehicle is independently driven, to drive the slave vehicle independently from said master vehicle.

29. A slave vehicle configured to be articulated to a master vehicle having a master driving system and a master onboard sensor arrangement configured to monitor at least said master driving system, and to be independently driven when not articulated to the master vehicle, the slave vehicle comprising a slave driving system configured to be controlled at a first control mode, at least when the slave vehicle is articulated to the master vehicle, to at least steer the slave vehicle so as to maintain said slave vehicle aligned with the master vehicle along a common longitudinal axis, upon receipt of input signals from said master onboard sensor arrangement at least when said master vehicle performs a turn on a horizontal plane; and to be further controlled at a second control mode, at least when the slave vehicle is independently driven, to drive the slave vehicle independently from said master vehicle.

30. A slave vehicle according to Embodiment 29, wherein said slave vehicle further comprises a control system configured to control the slave driving system at least when the slave vehicle is independently driven.

31. A slave vehicle according to any one of Embodiment 30, wherein said control system comprises an autonomous driving module, configured to autonomously control said slave driving system at least when the slave vehicle is independently driven.

32. A slave vehicle according to any one of Embodiment 29, 30 and 31, wherein said control system further comprises a signal receiver configured to receive input signals from an independent controller.

33. A slave vehicle according to Embodiment 32, wherein said control system is configured to produce driving instructions to said slave driving system upon the receipt of the input signals from the independent controller by the signal receiver so as to drive the slave vehicle accordingly, at least when the slave vehicle is independently driven.

34. A slave vehicle according to Embodiment 32 or Embodiment 33, wherein the independent controller is a remote controller configured to operate distally from said slave vehicle.

35. A slave vehicle according to any one of the preceding embodiments, wherein said slave vehicle further comprises a switch configured to selectively switch between the first and second control modes of the control system.

36. A slave vehicle according to any one of the preceding embodiments, further comprising an engine configured to be coupled to said slave driving system, at least when the slave vehicle is independently driven.

37. A slave vehicle according to any one of the preceding embodiments, wherein said slave driving system comprises a slave steering system configured to steer the slave vehicle, and a slave acceleration system configured to accelerate said slave vehicle.

38. A slave vehicle according to Embodiment 37, further comprising a slave onboard sensor arrangement configured to monitor at least said slave steering system, and thereby render the slave vehicle suitable for use as a master vehicle in an articulated vehicle assembly comprising such master vehicle and another slave vehicle.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 4B is a schematic top view of the articulated vehicle assembly of FIG. 1 performing a planar turn shown in stages;

FIG. 6 is a schematic perspective view of the articulated vehicle assembly of FIG. 5, driving whilst its articulated vehicles are subjected to different side slopes;

DETAILED DESCRIPTION OF EMBODIMENTS

Figure 1:
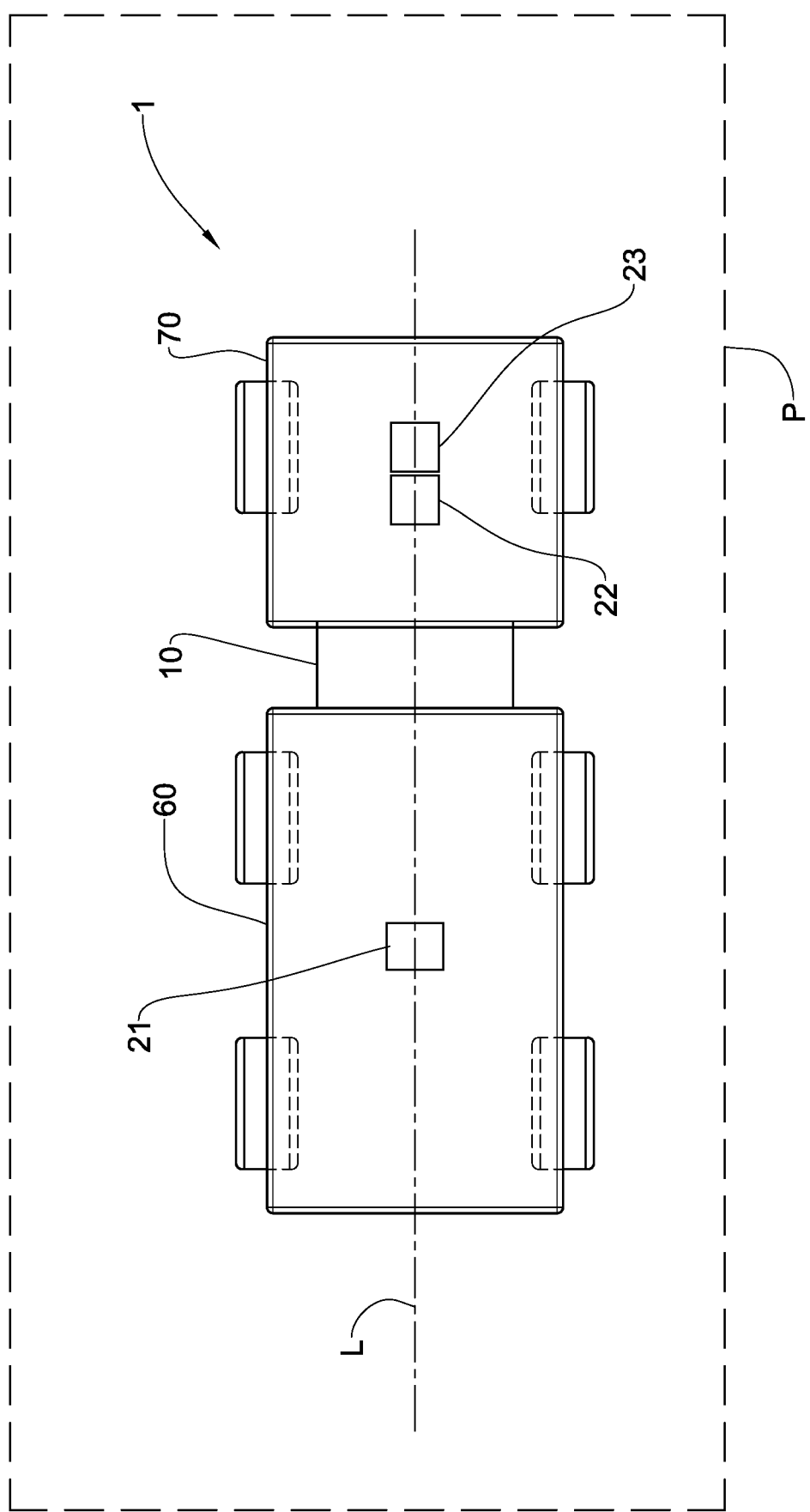
FIG. 1 is a schematic top view of an articulated vehicle assembly according to one example of the presently disclosed subject matter.

Attention is first directed to FIG. 1 of the drawings schematically illustrating an articulated vehicle assembly 1 comprising two vehicles 60, 70 articulated to one another in an aligned queue along a common central longitudinal axis L.

Figure 2:
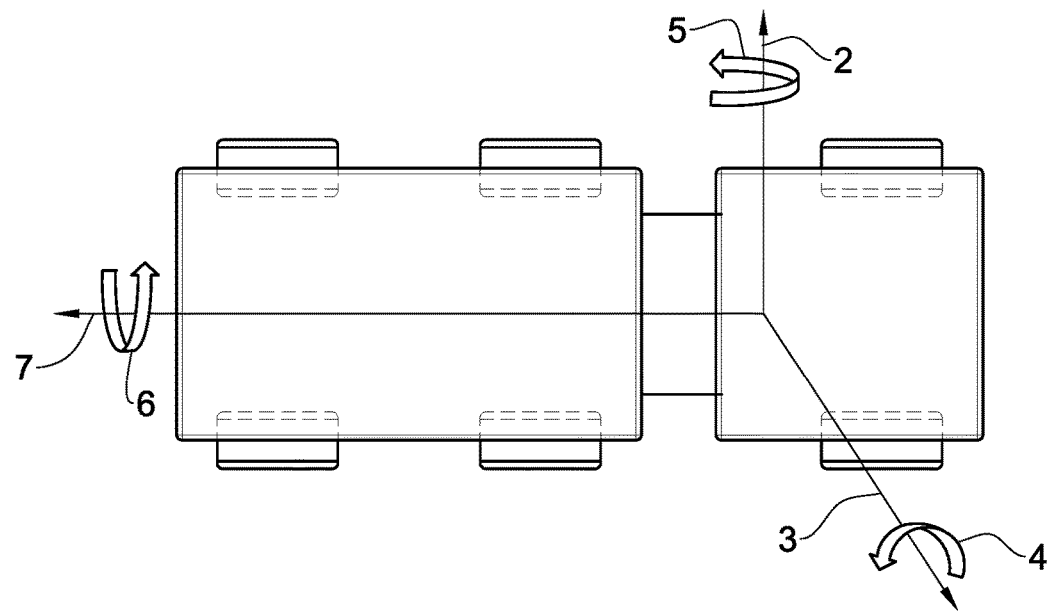
FIG. 2 is a schematic showing all 6 DOF of two articulated vehicles with respect to each other.

The vehicles 60 and 70 can be maintained in an aligned queue by means of an articulation system 10 linking therebetween, which mechanically constrains all translational degrees of freedom (DOF) of the vehicles relative to each other, designated by arrows 2, 3 and 7 in FIG. 2, as well as yaw movement designated by an arrow 4 on a horizontal plane P containing the axis L.

Figure 3A:
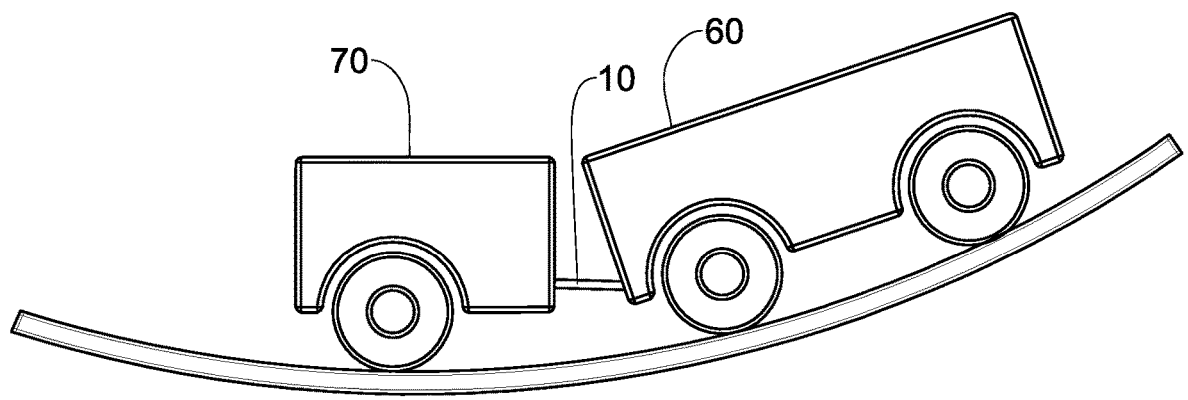
FIG. 3A is a schematic side view of the articulated vehicle assembly of FIG. 1 crossing a hollow.
Figure 3B:
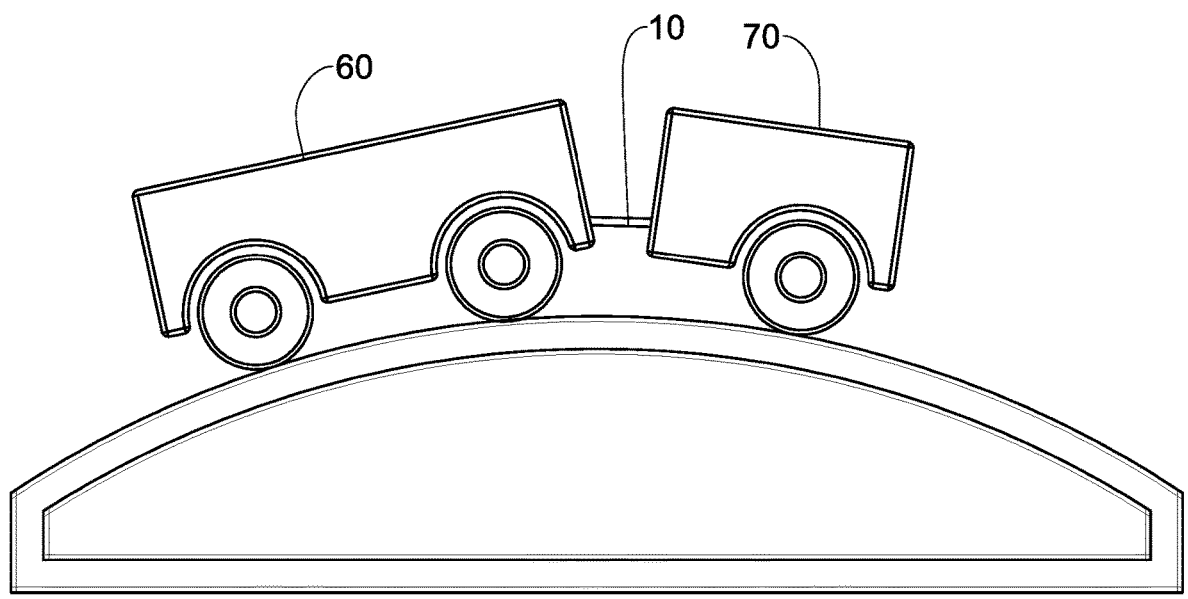
FIG. 3B is a schematic side view of the articulated vehicle assembly of FIG. 1 crossing an apex.
Figure 3C:
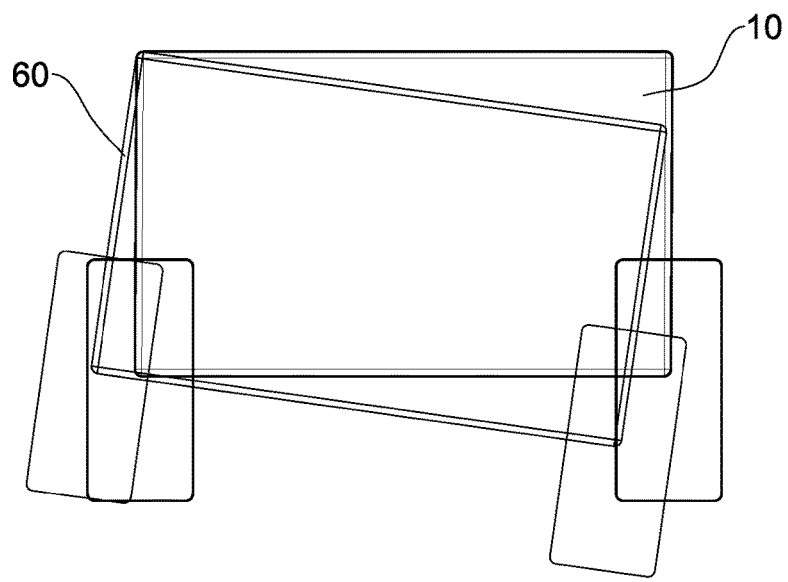
FIG. 3C is a schematic rear view of the articulated vehicle assembly of FIG. 1 driving whilst its articulated vehicles are subjected to different side slopes.

With such constraining the vehicles 60,70 are restricted from performing surge, sway, heave, or yaw movements with respect to each other, causing the articulated vehicle assembly 1 to behave somewhat as a rigid body in turns, yet, the vehicles 60,70 are allowed to perform with respect to each other a roll movement designated by an arrow 6 and a pitch movement designated by an arrow 5, in FIG. 2, allowing the articulated vehicle assembly 1 to twist and bend facilitating for example crossing the lowermost area of a hollow, as shown in FIG. 3A, crossing the highermost area of a hill, as shown in FIG. 3B, and driving whilst the vehicles 60 and 70 are subjected to different side slopes as shown in FIG. 3C.

As mentioned, such constrains also allow the aligned queue formation to be maintained during any movement of the vehicle assembly 1, including straight driving, reverse driving, turning, or any other maneuver of the vehicle assembly 1, thus facilitating maximal transfer of pushing and pulling forces between the vehicles 60,70.

One of the vehicles 60 and 70 can constitute a master vehicle, and it can be an ordinary vehicle capable of being individually operated by a driver, and the other one can be an autonomous, self-propelled, slave vehicle, which is articulated to the master vehicle in an aligned queue, and operable by a control system. The articulated vehicle assembly 1 can comprise more than one slave vehicle, which can be connected to the master vehicle or to any one of the slave vehicles.

The control system can be configured to drive the/each slave vehicle in the articulated vehicle assembly in conformity with the movement of the master vehicle, so as to minimize influence of the slave vehicle/s on the master vehicle's performance, and so as to simplify driving of the master vehicle with the slave vehicle/s by the driver.

In some cases, the control system can even be configured to drive each slave vehicle so as to contribute to the performance of the master vehicle, as will be explained hereinafter.

In the articulated vehicle assembly 1, the vehicle 60 constitutes a master vehicle, which is operable by a driver (not shown), while the vehicle 70 constitutes a single slave vehicle, which is self-propelled and operable by a control system 20.

The control system 20 is configured to monitor driving parameters of the master vehicle 60 in real-time, and adjust the same driving parameters in real-time for the slave vehicle 70 in correlation, to minimize the influence of the slave vehicle 70 on the master vehicle 70 performance, and to simplify driving of the master vehicle 60 with the slave vehicle 70 by the driver (not shown).

In the control system 20 the above mentioned driving parameters can include at least driving torque, instant center of rotation (ICOR) location, and brake pressure, while the performance of the master vehicle 60 is associated with its turning radius, acceleration rate, maximum speed, deceleration rate, braking distance, and traction. The control system 20 comprises: an onboard sensor arrangement 21 positioned onboard the master vehicle 60, on components thereof which allow monitoring the aforementioned driving parameters by suitable sensors, an onboard actuator arrangement 23 positioned onboard the slave vehicle 70 on components thereof which allow controlling the aforementioned driving parameters by suitable actuators, and a processing unit 22 positioned onboard the slave vehicle, and configured to receive real-time input driving signals related to the driving parameters of the master vehicle 60 from the onboard sensor arrangement 21, and produce real-time driving instructions, in the form of output driving signals, to the onboard actuator arrangement 23, to control these driving parameters at the slave vehicle 70 side.

Regarding the sensor and actuator arrangements, the former arrangement can comprise gas paddle condition sensors, brake paddle condition sensors, steering sensors, etc. and the latter arrangement can comprise correspondingly gas paddle actuators, brake paddle actuators, steering actuators, etc. such that for example, when the gas paddle sensors are configured to sense the condition of gas paddle of the master vehicle, the gas paddle actuators can be configured to control the gas paddle of the slave vehicle, etc.

The control system 20 can further comprise an auxiliary onboard sensor arrangement (not shown) which can be positioned onboard the slave vehicle 70, on components thereof which allow monitoring its own driving parameters, allowing the control system 20 to act as a closed loop control system and make corrections to the correlation to be applied between driving parameters of the master vehicle and the slave vehicle in real-time.

The control system 20 can also include a supplementary set of onboard sensors, positioned anywhere on an articulated vehicle assembly, which is configured to monitor the articulated vehicle assembly spatial orientation and state in real-time, (e.g. to determine whether the articulated vehicle assembly performs a turn, drives uphill, drives downhill, crossing a hollow, crossing an apex, etc.) This can assist the processor to determine more accurately the correlation to be applied between driving parameters of the master vehicle and the slave vehicle.

It can be appreciated that the processing unit position is not restricted to the slave vehicle and it can be positioned anywhere on the articulated vehicle assembly.

The control system 20 can be configured to correlate, in operation, between the driving torque of the master vehicle 60 and the driving torque of the slave vehicle 70 when the articulated vehicle assembly 1 drives forwardly in a straight manner, such that the two vehicles will individually generate the same acceleration at any given moment, preventing the trailing slave vehicle 70 from impeding the acceleration of the leading master vehicle 60.

More particularly, the processor 22 of the control system 20 can be configured to receive from the onboard sensing arrangement 21 in real-time a signal representative of the driving torque developed by the master vehicle 60, and generate a corresponding signal to the actuators 23 controlling the driving torque of the slave vehicle 70. In this way the master vehicle 60 can have the same acceleration rate and maximum speed it would have without the slave vehicle 70.

Figure 3D:
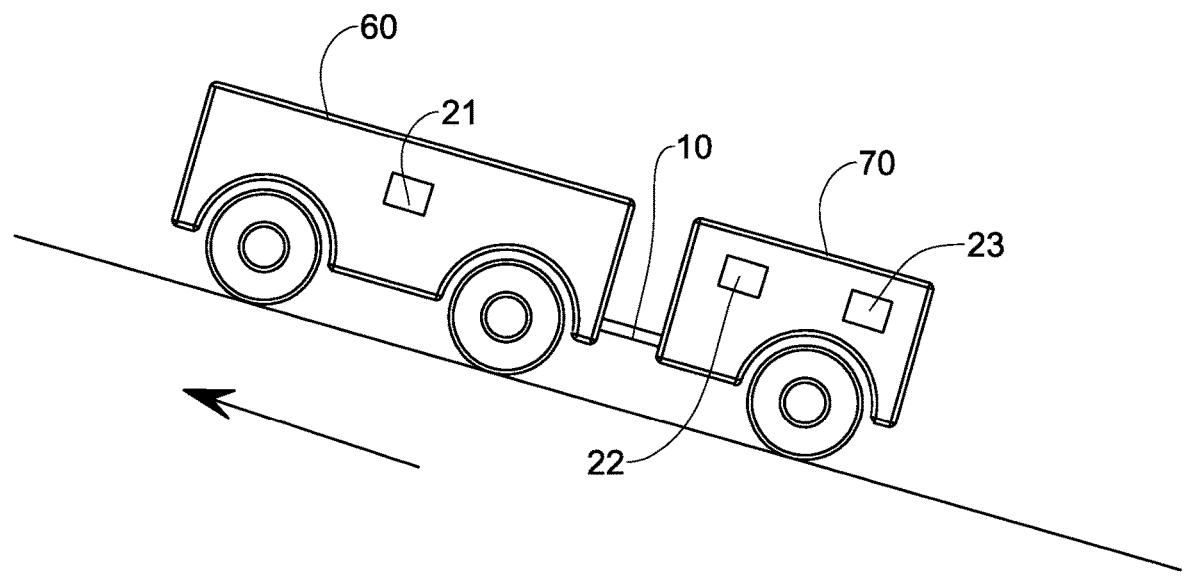
FIG. 3D is a schematic side view of the articulated vehicle assembly of FIG. 1 driving uphill.

The control system 20 can further be configured to correlate between the driving torque of the master vehicle 60 and the driving torque of the slave vehicle 70, so as to cause the slave vehicle 70 to apply a pushing force to the master vehicle, when the slave vehicle is articulated behind the master vehicle. This can be useful, for example, when the articulated vehicle assembly 1 drives uphill in a straight manner, as illustrated in FIG. 3D, in which case the control system 20 can adjust the driving torque of the trailing slave vehicle 70 to exceed that of the master vehicle 60, so as to effectively 'push' the master vehicle 60 uphill by virtue of the articulation system 10, and specifically the yaw restriction created thereby. It can be appreciated that when a slave vehicle is articulated in front of a master vehicle, this will result in a 'pulling' rather than 'pushing' operation.

Figure 3E:
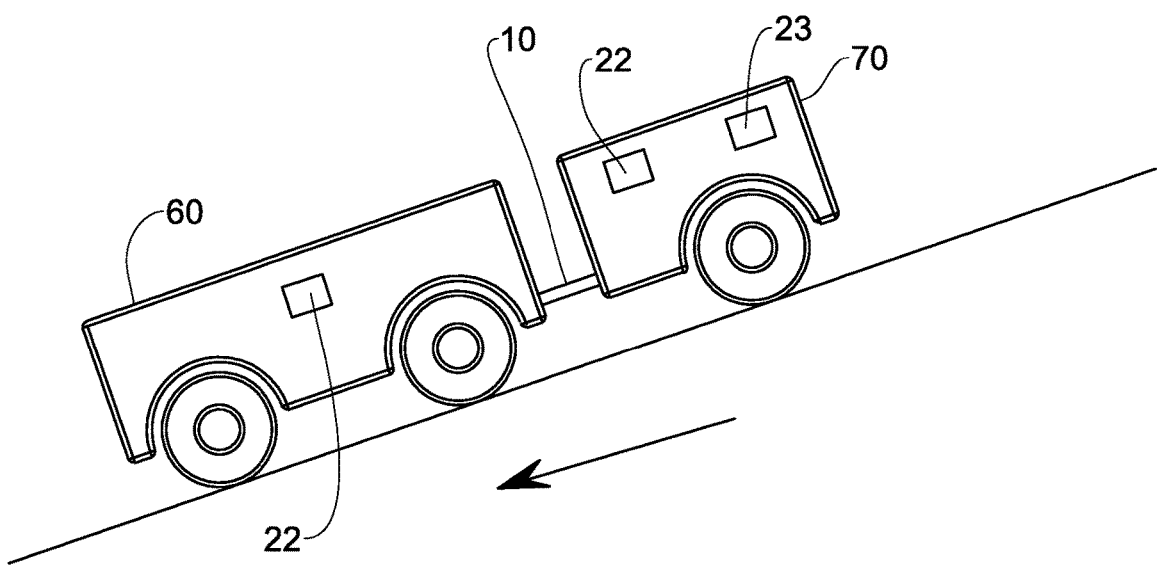
FIG. 3E is a schematic side view of the articulated vehicle assembly of FIG. 1 driving downhill.

Oppositely, the control system 20 can be configured to correlate between the braking pressure of the master vehicle 60 and the braking pressure of the trailing slave vehicle 70, when the articulated vehicle assembly 1 drives downhill in a straight manner, as illustrated in FIG. 3E, so that they can individually generate the same negative acceleration at any given moment, preventing the trailing slave vehicle 70 from pushing on the leading master vehicle 60 when the latter brakes.

More particularly, the processor 22 of the control system 20 can be configured to receive from the onboard sensing arrangement 21 in real-time a signal representative of the braking pressure developed by the master vehicle, and generate a corresponding signal to the actuators 23 controlling the braking pressure of the slave vehicle 70. In this way the master vehicle 60 can have the same deceleration rate and braking distance it would have without the slave vehicle 70.

The control system 20 can further be configured to correlate between the braking pressure of the master vehicle 60 and the braking pressure of the trailing slave vehicle 70, so that the slave vehicle 70 will apply a pulling force on the master vehicle 60. This can be useful, for example, when the articulated vehicle assembly 1 drives downhill in a straight manner, as illustrated in FIG. 3E, in which case the control system 20 can adjust the braking pressure of the trailing slave vehicle 70 to exceed that of the master vehicle 60, so as to effectively impede the master vehicle 60 advancement downhill by virtue of the articulation system 10, and specifically the translational DOF restriction created thereby. It can be appreciated that when a slave vehicle is articulated in front of a master vehicle, the above exceeding results in the master vehicle being supported by the articulation system and being prevented thereby from advancing downhill.

Each of the qualities described above and also they together can contribute to the capability of an articulated vehicle assembly of driving straightly on a planar surface, uphill or downhill, with performance improved relative to that which the master vehicle would have without the slave vehicle 70.

The control system 20 can further be configured to correlate between the individual ICOR of the master vehicle 60 and the individual ICOR of the slave vehicle 70, when the articulated vehicle assembly 1 performs a turn, so that they will individually turn about the same ICOR at any given moment, causing the entire articulated vehicle assembly to turn somewhat like a rigid body.

This can reduce stresses at the articulation system area 10, reduce the turning radius of the articulated vehicle assembly, contribute to the articulated vehicle assembly 1 behavior as a rigid body in turns, and prevent sliding of one of the vehicles as explained hereinbelow.

Figure 4A:
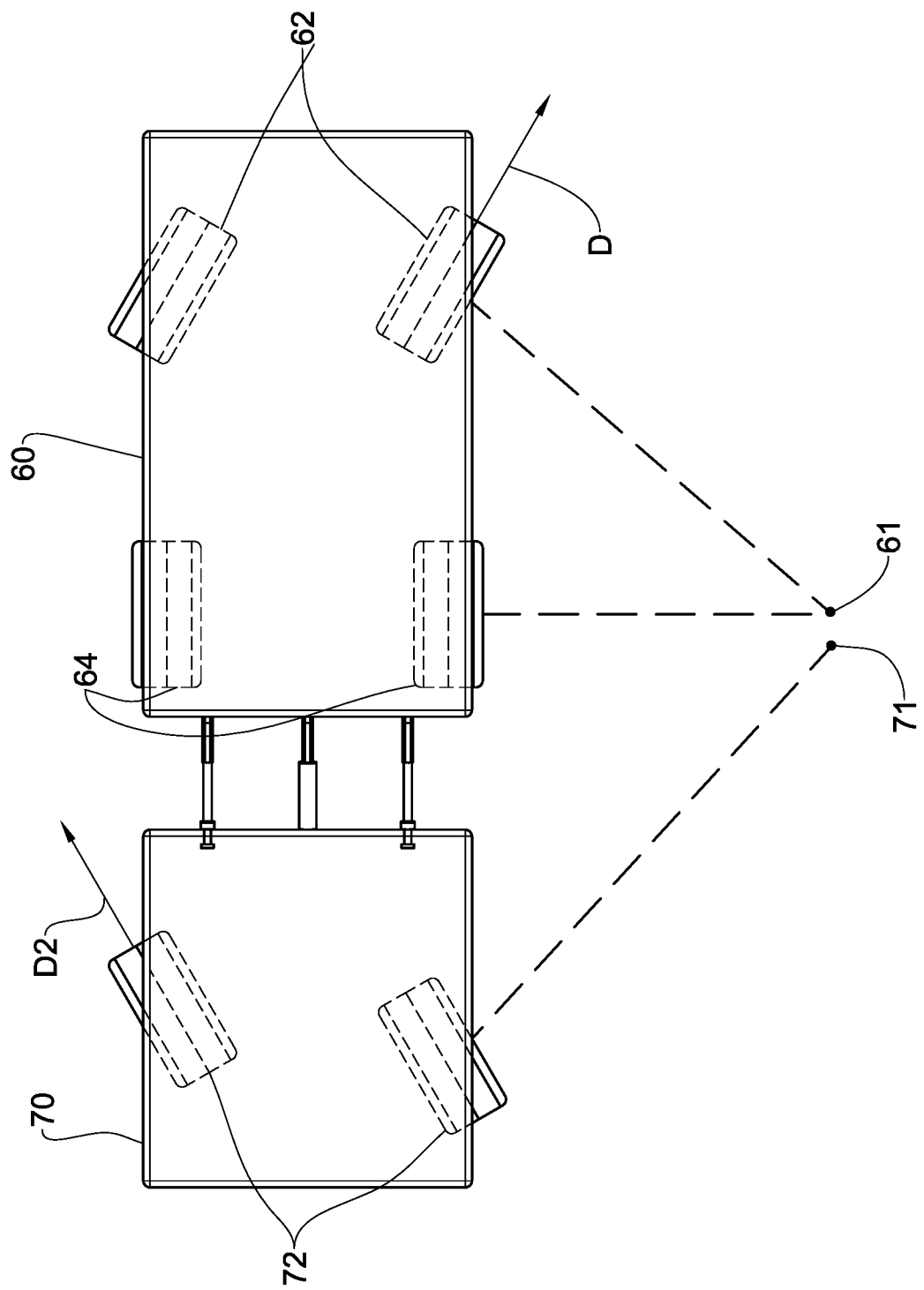
FIG. 4A is a schematic top view of the articulated vehicle assembly of FIG. 1 getting ready to perform a planar turn.

The master and the slave vehicles of the assembly of the presently disclosed subject matter can have wheels or any other means for moving and directing the vehicles such as caterpillar tracks, ski slides, etc. In case of wheels, all or some of the wheels of the master and slave vehicles can be drivable and steerable. For example, the master vehicle can comprise two front drivable and steerable wheels and two rear non-steerable wheels, and the slave vehicle comprise only two drivable and steerable wheels. One example of an assembly having such master and slave vehicles is shown in FIG. 4A illustrating a top view of the articulated vehicle assembly 1 with the master vehicle 60 and slave vehicle 70, in which two front drivable and steerable wheels 62 of the master vehicle 60 have orientation which defines a driving direction D of the master vehicle 60, and two rear non-steerable wheels 64 have fixed orientation parallel to the longitudinal axis L, and in which two drivable and steerable wheels 72 of the slave vehicle 70 (which are the only wheels it has) have orientation which defines a driving direction D2 of the slave vehicle. The assembly shown in FIG. 4A is in a state when it performs a planar turn, where its wheels are shown in dashed lines.

In this example, the control system 20 can be configured to evaluate, in real-time, using its onboard sensor arrangement 21, the location of the ICOR 61 of the master vehicle 60, for example, according to the orientation of its wheels 62 and 64, and adjust the driving parameters of the slave vehicle 70 accordingly, so as to bring the location of the slave vehicle's ICOR 71 as close as possible to the master vehicle's ICOR 61, for example by adjusting the orientation of its steerable wheels 72, which can be done constantly throughout the execution of the turn, for example, using such parameters as the wheelbase of the master vehicle 60 and the distance between the centers of the rear wheels 64 of the master vehicle 60 and of the steerable wheels 72 of the slave vehicle. The control system 20 can be configured to assume this distance as being constant, due to functioning of the articulation system 10, and specifically the yaw restriction created thereby.

The above adjustment can allow the vehicles 60 and 70 to remain aligned in a straight queue throughout the turn as seen in states (a), (b) and (c) shown in FIG. 4B, and furthermore, to bring the ICORs 61,71 of the vehicles to coincide, and can further prevent sliding of the rear wheels 64 of the master vehicle, which can be caused by performing four-wheel steering on a six-wheel vehicle.

More particularly, the processor 22 of the control system 20 can be configured to receive from the onboard sensing arrangement 21 in real-time a signal representative of the ICOR of the master vehicle 60, and generate a corresponding signal to the actuators 23 controlling the ICOR of the slave vehicle 70.

The processor 22 can be configured to limit the movement of the steerable wheels 72 of the slave vehicle when the articulated vehicle assembly drives at high speed, to prevent the articulated vehicle assembly from flipping over.

Maintaining the master and slave vehicles aligned during any routine movements described above, allows them to carry together a common payload, which can be greater than that the master vehicle can carry by itself, and it also simplifies the driver's driving of the master vehicle in the articulated vehicle assembly.

Moreover, performing four-wheel steering can reduce the turning radius of the articulated vehicle assembly which can improve its maneuverability.

In situations where more than one slave vehicle is incorporated in an articulated vehicle assembly, the control system can be configured to drive each slave vehicle in accordance with the master vehicle as described above, while adjusting its correlation with respect to the slave vehicle's position in the aligned queue, and the total number of slave vehicles incorporated in the articulated vehicle assembly. A single processing unit can be utilized for controlling all the slave vehicles in the assembly while adjusting each of their correlations with respect to their number, and their relative position in the queue, or alternatively, each slave vehicle in the assembly can comprise its own processing unit which adjusts its correlation with respect only to the position of its respective slave vehicle in the queue with respect to the master vehicle.

Figure 8:
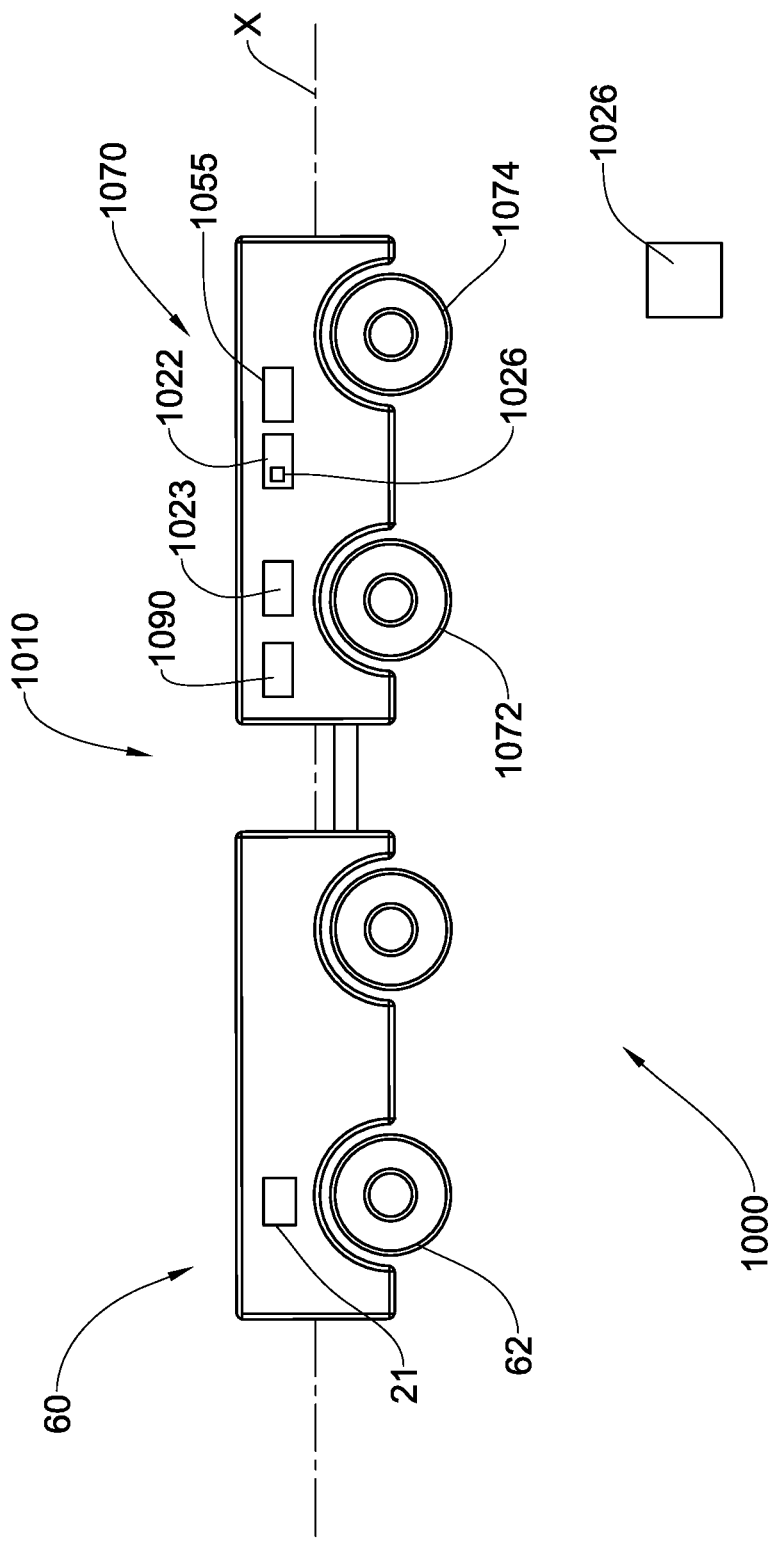
FIG. 8 is a schematic side view of an articulated vehicle assembly according to another example of the presently disclosed subject matter.

FIG. 8 illustrates an articulated vehicle assembly 1000 according to another example of the presently disclosed subject matter. The assembly 1000 consists of the master vehicle 60, and an independent slave vehicle 1070. The slave vehicle 1070 has all the attributes of the slave vehicle 70, yet it is further configured to be driven independently from the master vehicle 60.

With such independent driving, the slave vehicle 1070 can reach an area of interest, whilst being articulated to the master vehicle 1060, and be detached therefrom to operate independently at this area of interest.

Particularly, the slave vehicle 1070 is configured to be articulated to the master vehicle by an articulation system 1010 to form the articulated vehicle assembly 1000, and is also configured to be independently driven when not articulated to the master vehicle 60. The articulation system 1010 can be identical to the articulation system 10, or be any other articulation system known in the art.

The slave vehicle 1070 comprises a slave driving system which includes two drivable and steerable wheels 1072 identical to the wheels 72, and an actuator arrangement 1023, identical in function to the actuator arrangement 23.

The actuator arrangement 1023 is configured to steer the wheels 1072 and thereby constitute a steering system of the slave vehicle 1070, and to accelerate the wheels 1072, e.g. by controlling the amount of power transmitted to the wheels 1072 for example from an engine [not illustrated] of the slave vehicle 1070, and thereby constitute a driving system of the slave vehicle 1070.

The slave vehicle 1070 further comprises two passive auxiliary wheels 1074 configured to allow the slave vehicle 1070 to stand balanced when not connected to the master vehicle 60. In other embodiments of the presently disclosed subject matter, the extra two wheels 1074 can be replaced by a balancing mechanism configured to balance the slave vehicle 1070 on merely two wheels. In yet other embodiments of the presently disclosed subject matter the two auxiliary wheels 1074 can also be drivable and/or steerable, and the actuator arrangement 1023 can be configured to steer and accelerate those too. Further, instead of wheels or in combination therewith, the slave vehicle 1070 can include any other means for moving and directing it, such as caterpillar tracks, ski slides, etc.

The slave vehicle 1070 further comprises a control system 1022 which is similar in function to the processing unit 22, yet having two control modes. A first control mode for use when the slave vehicle 1070 is articulated to the master vehicle 60, where the control system 1022 is configured to operate as the processing unit 22, and a second control mode for use when the slave vehicle 1070 is not articulated to the master vehicle 60.

In the first control mode, the control system 1022 is configured to receive real-time input driving signals related to driving parameters of the master vehicle 60 from the onboard sensor arrangement 21, and produce real-time driving instructions, in the form of output driving signals, to the onboard actuator arrangement 1023, to control these driving parameters at the slave vehicle 1070 side, and thereby maintain the slave vehicle 1070 aligned with the master vehicle 60 along a common longitudinal axis X.

In the second control mode, the control system 1022 is configured to receive input signals from a different source than the onboard sensing arrangement 21, and produce independent driving signals to the actuator arrangement 1023, to drive the slave vehicle 1070 independently from the master vehicle 60. Such source can be, for example, a memory unit containing pre-generated driving instructions, a tracking beacon system of the kind used by troops in a combat field, a remote controller, an onboard controller, etc. In the present example, the control system 1022 comprises a signal receiver 1025 configured, at least in the second mode of operation of the control system 1022, to receive input signals from an independent controller. Upon receipt of those input signals, the control system 1022 is configured to produce driving instructions to the slave onboard actuator arrangement 1023 so as to drive the slave vehicle 1070 accordingly.

The independent controller herein is constituted by a remote controller 1026, which can be hand held, or mounted on any vehicle or structure, configured to produce control signals to the control system 1022. The remote controller 1026 can be based on GPS tracking, beacon tracking, heat tracking, etc. or include an interface via which a user can produce real-time control signals on demand. In other embodiments of the presently disclosed subject matter the control system 1022 can comprise an autonomous driving module, configured to autonomously control the actuator arrangement 1023.

The transition between the first control mode and the second control mode can be performed by a designated switch 1055 in the slave vehicle. The switch 1055 can be switched on demand by a user, or be automatically switched when the slave vehicle articulates to/detaches from the master vehicle 60, optionally, by integrating the switch 1055 in the articulation system of the articulated vehicle assembly 1070, e.g. the articulation system 10.

As a whole, when the slave vehicle 1070 is articulated to the master vehicle 60, the control system 1022 is configured to receive input signals from the onboard sensor arrangement 21 of the master vehicle 60, and produce corresponding driving instructions to the slave onboard actuator arrangement 1023, so as to control the driving parameters at the slave vehicle 1070 side, and thereby maintain the slave vehicle 1070 aligned with the master vehicle 60 along the common longitudinal axis X.

When the slave vehicle 1070 is not articulated to the master vehicle 60, the control system 1022 is configured to receive input signals from an independent controller, e.g., remote controller 1026, and produce driving instructions to the slave onboard actuator arrangement 1023 so as to drive the slave vehicle 1070 accordingly. The slave vehicle 1070 further comprises an optional master onboard sensor arrangement 1090, for use when the control system 1022 is in its second control mode.

The master onboard sensor arrangement 1090 is positioned onboard the slave vehicle 1070, on components thereof which allow monitoring the aforementioned driving parameters by suitable sensors. The sensor arrangement 1090 is configured to monitor the slave driving system and produce corresponding input signals, to allow the slave vehicle 1070 to be used as a master vehicle in another articulated vehicle assembly, together with another slave vehicle. The sensor arrangement 1090 can comprise gas paddle condition sensors, brake paddle condition sensors, steering sensors, etc. and the actuator arrangement 1023 can comprise correspondingly gas paddle actuators, brake paddle actuators, steering actuators, etc. such that for example, when the gas paddle sensors are configured to sense the condition of gas paddle of the master vehicle, the gas paddle actuators can be configured to control the gas paddle of the slave vehicle, etc.

Figure 5:
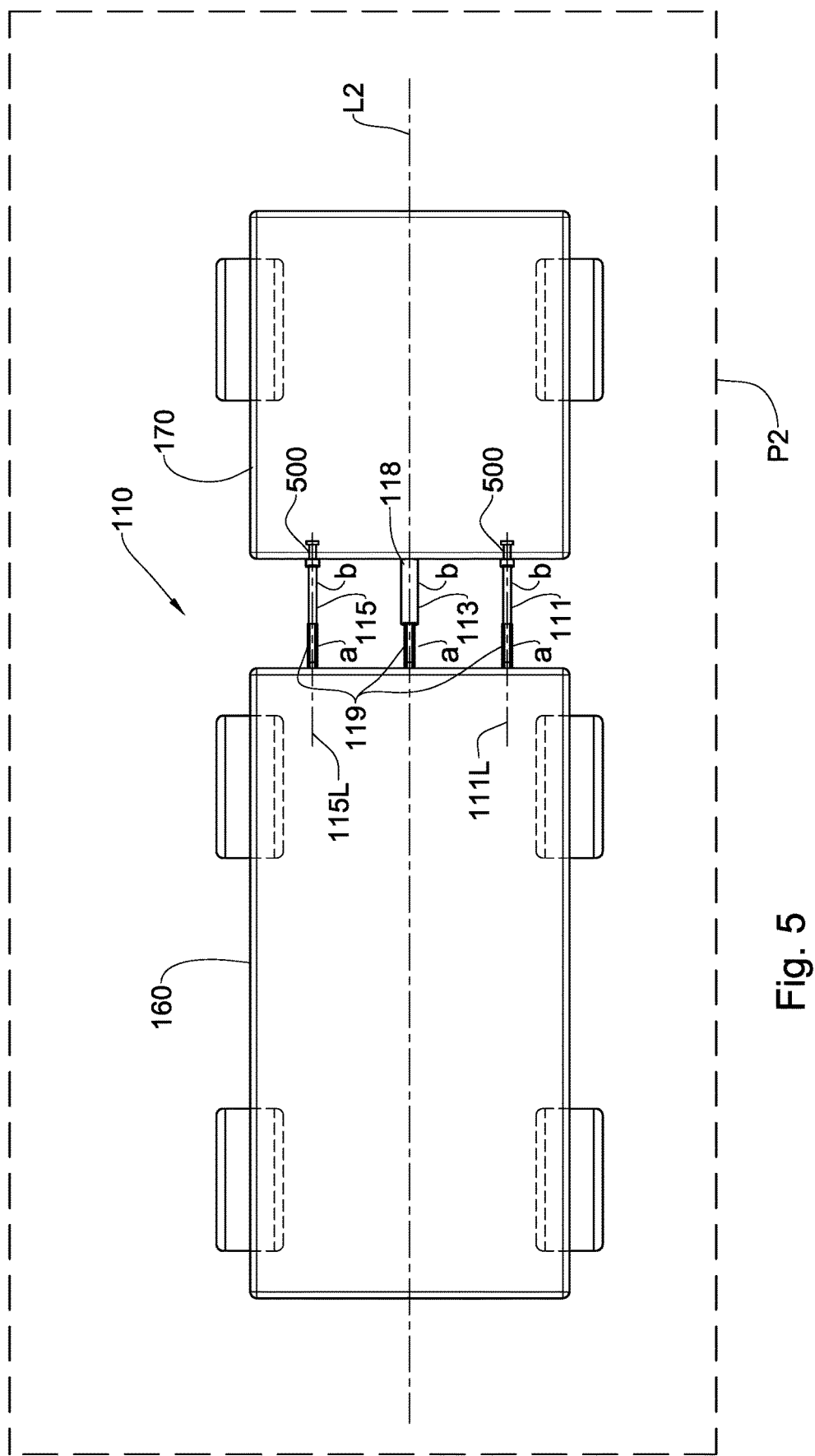
FIG. 5 is a schematic top view of an articulation system according to another example of the presently disclosed subject matter.

Attention is now directed to FIG. 5 of the drawings schematically illustrating one example of a system that can be used for articulating a master and a slave vehicle in a manner allowing there movements as described above.

In this example, a master vehicle 160 and a slave vehicle 170 are connected by an articulation system 110 to form an articulated vehicle assembly 100, in which they are configured to be maintained in an aligned queue along their common longitudinal axis L2.

The articulation system 110 is configured for maintaining the articulated vehicles 160 and 170 in an aligned queue, by constraining at least partially all translational DOF of the vehicles (designated by the arrows 2, 3 and 7 in FIG. 2) relatively to each other, as well as yaw movement of one of the vehicles with respect to the other (designated by the arrow 4 in FIG. 2) on a horizontal reference plane P2 containing the axis L2, while allowing a certain extent of biased freedom as explained herein below.

In this example, the articulation system 110 comprises three elongated members, which in this example are in the form of bars 111,113 and 115, such that the bars 111 and 115 are disposed on two sides of the bar 113 in a symmetrical fashion with respect to the longitudinal axis L2, thus, the bars 111 and 115 will be further referred to as lateral bars and the bar 113 will be further referred to as a central bar.

Each bar 111,113,115 has a first end 111a,113a,115a and a second end 111b, 113b, 115b, respectively. The first end 111a,113a,115a of each bar is connected to the vehicle 160 by means of a rotational coupling which constrains all translational DOF between the bars and the corresponding vehicle 160, while allowing yaw movement therebetween on the horizontal plane P2 containing the longitudinal axis L2, pitch movement on a vertical plane (not shown) containing the longitudinal axis L2, and roll movement on a vertical plane (not shown) perpendicular to the axis L2.

The rotational coupling can be of any suitable type, such as ball-and-socket coupling designated as 119.

Obviously, all the allowed DOF are restricted to the mechanical constrains of the articulated vehicle assembly 100, and those of the ball-and-socket coupling.

The second end 113b of the central bar is connected to the vehicle 170 by rigid means e.g. by welding fixation designated as 118, which constrains all six DOF between the respective bar 113 and the vehicle 170, whereby a constant distance between the vehicles 160 and 170 can be maintained. This distance is normally equal to length of the bar 113.

the second ends 111b and 115b of the lateral bars are connected to the vehicle 170 by means of a resilient coupling, e.g. resilient bushing 500 (best seen in FIG. 7A-7C), which constrains heave and sway between the bars 111,115 and the vehicle 170, while allowing biased surge movement along a longitudinal axis 111L,115L of its associated bar.

This surge movement can be useful for example when one of the vehicles roll with respect to the other, as in FIG. 6. To allow this state to occur, the distance between the vehicles at the area of the lateral bars 111,115, should be alterable, meaning that a bridge assembly containing a bar 111,115 and the two couplings associated thereto, should be able to extend.

To allow such extension, the resilient coupling can be configured to elastically deform under load, at least along the longitudinal axis of its respective bar.

The resilient coupling can be designed to deform only under minimal load, which can be lower than the load applied thereon when one of the vehicles performs a roll with respect to the other, as in FIG. 6.

The resilient coupling can be in the form of an assembly, mounted to the end of its associated bar so as to surround it, having an axisymmetric shape with respect to its longitudinal axis, and configured to connect between the associated bar and a flange of the corresponding vehicle specifically designed to be fitted with the associated bar.

The connection between the bar and the resilient coupling can be loose to allow some extent of freedom for the associated bar to perform yaw and pitch with respect to the flange, for example for the purpose of increasing the bar resiliency.

Figure 7A:
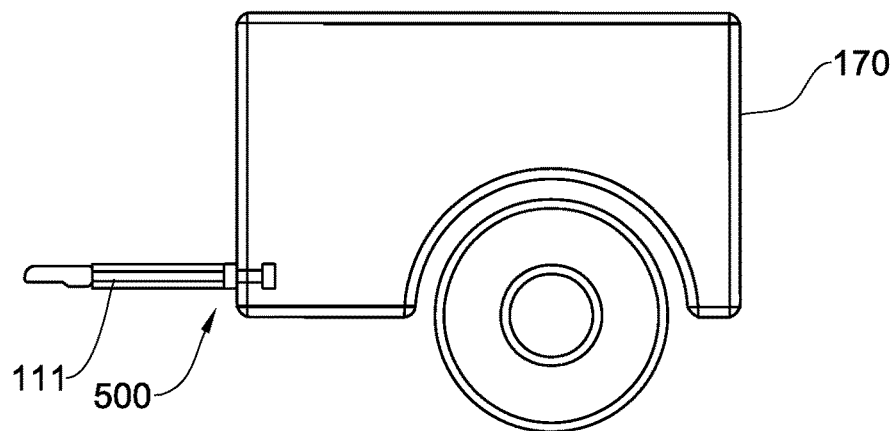
FIG. 7A is a schematic side view of a vehicle and an articulation system of FIG. 5.
Figure 7B:
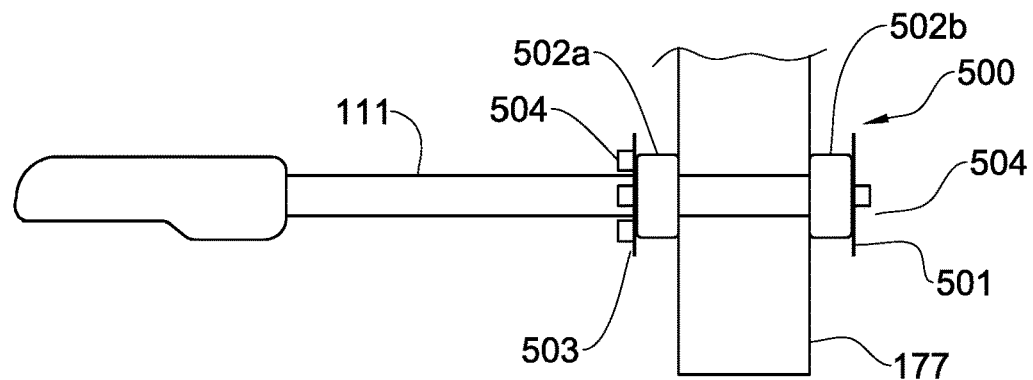
FIG. 7B is a schematic side view of a resilient bushing of the articulation system of FIG. 5, according to one example of the presently disclosed subject matter.
Figure 7C:
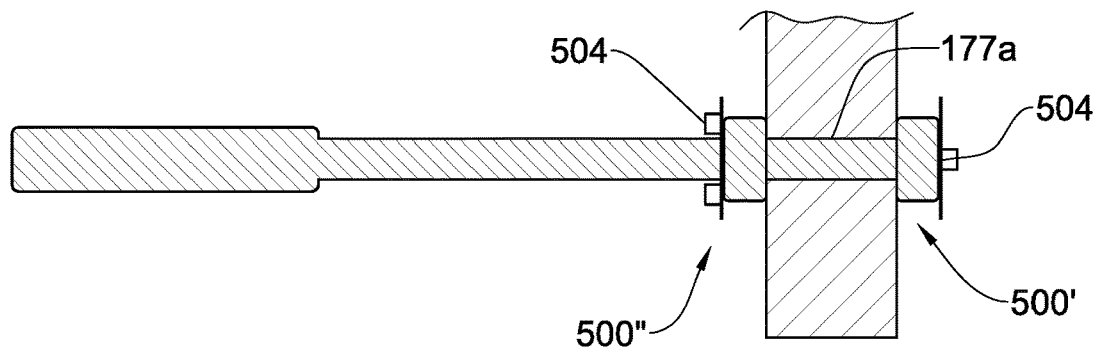
FIG. 7C is a schematic cross-sectional view of the resilient bushing of FIG. 7B, taken along a plane A-A.

An example of a resilient coupling is resilient bushing 500 illustrated in FIGS. 7A-7C with respect to the bar 111, although the same bushing can be implemented with the bar 115 as well.

In the described example, the vehicle 170 has a flange 177 to which the bushing is connected. The bushing 500 comprises a back rigid disk 501, a front rigid disk 503 and two resilient members 502a and 502b sandwiched therebetween, configured to engage the flange 177 from two opposite sides thereof.

More particularly, the flange 177 is formed with a duct 177a and a second end 111b of the bar 111 is configured to be slidingably received within that duct, optionally, in a clearance fit fashion (loose fashion). The resilient members 502a and 502b being sandwiched between the two rigid disks 501 and 503, are configured to slidingably wrap the respective bar 111 from either side of the duct 177a. The rigid disks are configured to be fixedly connected to the bar, by an interconnecting member or directly.

The flange 177 thereby divides the bushing 500 into a back bushing portion 500' comprising the back rigid disk 501 and the back resilient portion 502a, and a front bushing portion 500" comprising the front rigid disk 503 and the front resilient portion 502b.

The entire structure of the bushing 500 can be held tight by fixation means 504 fixedly connected to the bar 111, to ensure intimate contact between the parts of the assembly.

The above structure allows the bar 111, which is connected to bushing 500 at one end 111b, to surge along its longitudinal axis 111L, towards the vehicle 160 or away from it, by compressing the respective resilient member 502a, 502b against the flange 117. In the process, the respective disk 501,503 is being urged against its respective resilient member 502a,502b, which in turn is being urged against flange 177, causing the respective resilient member 502a,502b to compress as the bar 111 moves along its longitudinal axis 111L.

This allowed movement, when performed, causes the distance between the vehicles 160, 170, at the area of the bushings 500, i.e. at the area of lateral bars 111,115, to change under load, thus allowing the vehicles 160,170, to perform roll movement with respect to each other, as seen in FIG. 6.

The above structure also allows the bar 111 to create an angle with the flange 177, by virtue of the clearance fitting between the duct 177a and the bar 111.

In this case, the bushing 500 can functionally constitute as a constrained ball-and-socket couplings as it can allow pitch, roll and yaw movement between its respective bar 111 and its respective vehicle 170.

The material from which the resilient members 502a,502b are made, can be resilient enough to allow biasing, yet strong enough to facilitate supporting one of the vehicles by the other when the other is exposed to an extreme side slope.

It can also be configured to allow a first extent of deformation per load along a longitudinal axis (e.g. 111L, 115L) of its respective bar and a second extent of deformation per load along an axis perpendicular to the longitudinal axis of its respective bar, the first extent being lower than the second extent for the same load value.

The combination of three rotational couplings 119 being disposed on one end 111a,113a,115a of the bars allows pitch movement between the vehicles 160 and 170.

When the rigid coupling 118 is added on the second end 113b, and resilient couplings such as bushing 500 are added on the second ends 111b,115b, in a six connection points structure, all six translational DOF and the yaw movement between the vehicles 160 and 170 is constrained, whilst biased roll movement is allowed. This allows the vehicles to perform roll movement with respect to each other, in spite of the tendency of a six connection points structure to constrain such movement. This roll movement is also biased due to the resiliency of the coupling 500.

As a whole, the manner in which the bars 111, 113 and 115 are connected to the vehicles 160 and 170 allows the articulation system 110 to mechanically constrain all translational DOF of the vehicles relatively to each other, as well as yaw rotational movement of one of the vehicles with respect to the other along the horizontal plane P2 containing the axis L2, whilst allowing pitch movement therebetween as well as biased roll movement.

In other embodiments of the invention not illustrated herein, the resilient bushing can be replaced by a standard coupling such as a ball-and-socket coupling which allow yaw, pitch and roll movements, yet do not allow translational surge movement along the longitudinal axis of its respective bar. To allow such surge movement, a resilient member can be incorporated in the coupling respective bar or in the other coupling associated therewith.

The invention claimed is:

1. An articulation system for articulating in a queue two adjacent vehicles along a common longitudinal axis, said articulation system comprising:
   at least three elongated members configured to extend between said two adjacent vehicles, each of the at least three elongated members having a first end connectable to a first vehicle via a first coupling configured to constrain all translational degrees of freedom (DOF) while at least partially allowing at least pitch movement on a vertical plane containing said longitudinal axis, and a second end connectable to a second vehicle via a second coupling;
   wherein at least one of the second couplings is configured to at least partially constrain said pitch movement and constituting a pitch-constraining coupling; wherein at least one of the second couplings is configured to at least partially constrain yaw movement on a horizontal plane containing said longitudinal axis and constituting a yaw-constraining coupling;
   wherein the at least three elongated members include at least two outermost elongated members disposed at a maximal distance from the longitudinal axis on two sides thereof, the second couplings via which the second ends of the at least two outermost elongated members are connectable to the second vehicle being other than the pitch-constraining coupling and the yaw-constraining coupling;
   wherein each of the at least three elongated members with the associated first and second couplings thereof constitutes a bridge assembly having a bridge longitudinal axis extending between the first and second couplings thereof, and wherein the bridge assemblies of the at least two outermost members each include an elastic portion configured to perform elastic deformation under load;
   wherein said second couplings, via which the second ends of the at least two outermost elongated members are connectable to the second vehicle, are configured to at least partially allow translational movement along said bridge longitudinal axis; and
   wherein said elastic portion is disposed at the second coupling of the respective bridge assembly.

2. The articulation system according to claim 1, wherein said second couplings, via which the second ends of the two outermost elongated members are connectable to the second vehicle, are configured to at least partially allow pitch movement along the vertical plane containing said longitudinal axis, and at least partially allow yaw movement along the horizontal plane containing said longitudinal axis.

3. The articulation system according to claim 1, wherein said elastic portion is configured to allow a first extent of deformation per load along the bridge longitudinal axis, and a second extent of deformation per load along an axis perpendicular to the bridge longitudinal axis, the first extent being lower than the second extent for the same load value.

4. The articulation system according to claim 1, constituting a part of an articulated vehicle assembly, which comprises, in addition to the articulation system, the first and the second vehicles, wherein one of said first or second vehicles is a master vehicle having a master steering system and an onboard sensor arrangement configured to monitor at least said master steering system which defines a location of a master instant center of rotation (ICOR), related to said master vehicle, on said horizontal plane, and the other vehicle is a slave vehicle having a slave steering system and an onboard actuator arrangement configured to manipulate at least said slave steering system which is configured to define a location of a slave ICOR related with said slave vehicle, on said horizontal plane.

5. An articulated vehicle assembly, comprising:
a master vehicle having a master steering system and an onboard sensor arrangement configured to monitor at least said master steering system;
a slave vehicle having a slave steering system and an onboard actuator arrangement configured to manipulate at least said slave steering system;
an articulation system for articulating in a queue the master and the slave vehicles along a common longitudinal axis, said articulation system being configured to at least partially constrain all translational degrees of freedom (DOF) of the vehicles relative to each other, and at least partially constrain a yaw rotational movement of one of the vehicles with respect to the other on a horizontal plane containing said longitudinal axis; and
a control system including the onboard sensor arrangement, the onboard actuator arrangement, and a processing unit configured to receive input signals from said onboard sensor arrangement and produce corresponding output signals to the onboard actuator arrangement to manipulate said slave steering system so as to maintain said master vehicle and the slave vehicle aligned along said common longitudinal axis, at least when said master vehicle performs a turn on said horizontal plane.

6. The articulated vehicle assembly according to claim 5, wherein the master steering system is configured to be manipulated by a user, and defines a location of a master instant center of rotation (ICOR), related to said master vehicle, on said horizontal plane, and wherein said slave steering system is configured to define a location of a slave ICOR, related to said slave vehicle, on said horizontal plane.

7. The articulated vehicle assembly according to claim 6, wherein said control system is configured to receive, from said master steering system via said sensor arrangement, input steering signals indicative of the location of said master ICOR, and process them to produce corresponding output steering signals to the actuator arrangement to manipulate said slave steering system for bringing the location of the slave ICOR to a location closer to that of the master ICOR, than the slave ICOR had prior to receiving said output steering signals.

8. The articulated vehicle assembly according to claim 6, wherein the slave vehicle is configured to be independently driven when not articulated to the master vehicle, and comprises a slave driving system configured to be controlled at a first control mode, at least when the slave vehicle is articulated to the master vehicle, to at least steer the slave vehicle so as to maintain said slave vehicle aligned with the master vehicle along a common longitudinal axis, upon receipt of input signals from said master onboard sensor arrangement, at least when said master vehicle performs a turn on a horizontal plane; and to be further controlled at a second control mode, at least when the slave vehicle is independently driven, to drive the slave vehicle independently from said master vehicle.

9. The articulated vehicle assembly according to claim 6, wherein said slave steering system and said master steering system comprise a slave steerable axle and a master steerable axle respectively.

10. The articulated vehicle assembly according to claim 9, wherein said control system is configured to manipulate the slave steering system to move the slave steerable axle in a direction opposite to that of said master steerable axle.

11. The articulated vehicle assembly according to claim 6 wherein each of said vehicles comprise one or more steerable wheels, and wherein said control system can be configured to maintain the steerable wheels of the slave vehicle, when the master steerable wheels are being oriented at a first angle with respect to said common longitudinal axis, when viewed from above, at a second angle correlated with the first angle.

12. The articulated vehicle assembly according to claim 11, wherein the wheels of the slave vehicle are drivable and configured, when the wheels of the master vehicle are driven at a first velocity, to be driven at a second velocity which is correlated with the first velocity.

13. The articulated vehicle assembly according to claim 11, wherein the steerable wheels of the master vehicle are disposed at the front of said master vehicle, and the master vehicle further comprises non-steerable rear wheels; and wherein said control system is configured to manipulate said steerable wheels of the slave vehicle so as to prevent translational dragging of said non-steerable wheels on a ground surface when the master vehicle performs a turn thereupon.

14. A slave vehicle configured to be articulated to a master vehicle having a master driving system and a master onboard sensor arrangement configured to monitor at least said master driving system, and to be independently driven when not articulated to the master vehicle, the slave vehicle comprising:
a slave driving system configured to be controlled at a first control mode, at least when the slave vehicle is articulated to the master vehicle, to at least steer the slave vehicle so as to maintain said slave vehicle aligned with the master vehicle along a common longitudinal axis, upon receipt of input signals from said master onboard sensor arrangement at least when said master vehicle performs a turn on a horizontal plane; and to be further controlled at a second control mode, at least when the slave vehicle is independently driven, to drive the slave vehicle independently from said master vehicle.

15. The slave vehicle according to claim 14, wherein said slave vehicle further comprises a switch configured to selectively switch between the first and second control modes of the control system.

16. The slave vehicle according to claim 14, further comprising an engine configured to be coupled to said slave driving system, at least when the slave vehicle is independently driven.

17. The slave vehicle according to claim 14, wherein said slave driving system comprises a slave steering system configured to steer the slave vehicle, and a slave acceleration system configured to accelerate said slave vehicle.

18. The slave vehicle according to claim 17, further comprising a slave onboard sensor arrangement configured to monitor at least said slave steering system, and thereby render the slave vehicle suitable for use as a master vehicle in an articulated vehicle assembly comprising such master vehicle and another slave vehicle.

* * * * *